(12) United States Patent
Pedersen et al.

(10) Patent No.: US 8,010,803 B2
(45) Date of Patent: *Aug. 30, 2011

(54) METHODS AND APPARATUS FOR AUTOMATED EXPORT COMPLIANCE

(75) Inventors: Palle Martin Pedersen, Brookline, MA (US); David Golombek, Allston, MA (US); Douglas A. Levin, Boston, MA (US); John J. Smith, Arlington, MA (US)

(73) Assignee: Black Duck Software, Inc., Waltham, MA (US)

( * ) Notice: Subject to any disclaimer, the term of this patent is extended or adjusted under 35 U.S.C. 154(b) by 652 days.

This patent is subject to a terminal disclaimer.

(21) Appl. No.: 11/707,672

(22) Filed: Feb. 15, 2007

(65) Prior Publication Data

US 2008/0091677 A1    Apr. 17, 2008

Related U.S. Application Data

(63) Continuation of application No. 11/580,220, filed on Oct. 12, 2006, now Pat. No. 7,681,045.

(51) Int. Cl.
*G06F 11/30* (2006.01)
(52) U.S. Cl. .................. 713/190; 713/153; 726/22
(58) Field of Classification Search .............. 713/150, 713/190, 153; 726/22–25
See application file for complete search history.

(56) References Cited

U.S. PATENT DOCUMENTS

| | | | |
|---|---|---|---|
| 5,313,616 A | 5/1994 | Cline et al. | |
| 5,343,527 A | 8/1994 | Moore | |
| 5,469,354 A | 11/1995 | Hatakeyama et al. | |
| 5,577,249 A | 11/1996 | Califano | |
| 5,765,152 A | 6/1998 | Erickson | |
| 5,774,883 A | 6/1998 | Andersen et al. | |
| 5,796,830 A | 8/1998 | Johnson et al. | |
| 5,892,900 A | 4/1999 | Ginter et al. | |
| 5,893,095 A | 4/1999 | Jain et al. | |
| 5,893,910 A * | 4/1999 | Martineau et al. | 1/1 |
| 5,917,912 A | 6/1999 | Ginter et al. | |
| 5,958,051 A | 9/1999 | Renaud et al. | |
| 6,029,002 A | 2/2000 | Afifi et al. | |
| 6,035,402 A | 3/2000 | Vaeth et al. | |
| 6,072,493 A | 6/2000 | Driskell et al. | |
| 6,125,446 A * | 9/2000 | Olarig et al. | 726/8 |
| 6,148,401 A | 11/2000 | Devanbu et al. | |
| 6,188,995 B1 | 2/2001 | Garst et al. | |
| 6,189,146 B1 | 2/2001 | Misra et al. | |
| 6,226,618 B1 | 5/2001 | Downs et al. | |

(Continued)

FOREIGN PATENT DOCUMENTS

WO    WO-/02/27486    4/2002

OTHER PUBLICATIONS

"ASAP eSMART Overview," ASAP Software, 1999-2002, pp. 1-2.

(Continued)

*Primary Examiner* — David Garcia Cervetti
(74) *Attorney, Agent, or Firm* — Goodwin Procter LLP

(57) ABSTRACT

A system and method for determining export requirements for a content file may include examining a content file to identify content used by or included in the content file that is subject to export control, determining, in response to the identified content, export requirements that are applicable to the content file, and providing an indication of the determined export requirements.

18 Claims, 20 Drawing Sheets

U.S. PATENT DOCUMENTS

| | | | |
|---|---|---|---|
| 6,240,409 B1 | 5/2001 | Aiken | |
| 6,249,769 B1 | 6/2001 | Ruffin et al. | |
| 6,260,141 B1 | 7/2001 | Park et al. | |
| 6,263,348 B1 | 7/2001 | Kathrow et al. | |
| 6,275,223 B1 | 8/2001 | Hughes et al. | |
| 6,282,698 B1 | 8/2001 | Baker et al. | |
| 6,330,670 B1 | 12/2001 | England et al. | |
| 6,381,698 B1 | 4/2002 | Devanbu et al. | |
| 6,393,438 B1 | 5/2002 | Kathrow et al. | |
| 6,397,205 B1 | 5/2002 | Juola | |
| 6,480,834 B1 | 11/2002 | Engle et al. | |
| 6,480,959 B1 | 11/2002 | Granger et al. | |
| 6,493,709 B1 | 12/2002 | Aiken | |
| 6,499,035 B1 | 12/2002 | Sobeski | |
| 6,546,114 B1 | 4/2003 | Venkatesan et al. | |
| 6,557,105 B1 | 4/2003 | Tardo et al. | |
| 6,574,348 B1 | 6/2003 | Venkatesan et al. | |
| 6,658,626 B1 | 12/2003 | Aiken | |
| 6,862,696 B1 | 3/2005 | Voas et al. | |
| 6,904,425 B2 * | 6/2005 | Sung | 1/1 |
| 6,931,532 B1 | 8/2005 | Davis et al. | |
| 6,941,459 B1 | 9/2005 | Hind et al. | |
| 6,954,747 B1 | 10/2005 | Wang et al. | |
| 6,961,849 B1 | 11/2005 | Davis et al. | |
| 6,976,170 B1 * | 12/2005 | Kelly | 713/181 |
| 6,978,367 B1 | 12/2005 | Hind et al. | |
| 6,981,023 B1 | 12/2005 | Hamilton et al. | |
| 6,983,371 B1 | 1/2006 | Hurtado et al. | |
| 7,003,765 B1 * | 2/2006 | Venkatasubramanian et al. | 717/143 |
| 7,197,156 B1 | 3/2007 | Levy | |
| 7,254,587 B2 | 8/2007 | Lee et al. | |
| 7,287,159 B2 * | 10/2007 | Rabin et al. | 713/161 |
| 7,305,701 B2 | 12/2007 | Brezak et al. | |
| 7,356,188 B2 * | 4/2008 | Venkatesan et al. | 382/229 |
| 7,469,338 B2 * | 12/2008 | Buer | 713/170 |
| 7,493,596 B2 * | 2/2009 | Atkin et al. | 717/124 |
| 7,503,035 B2 * | 3/2009 | Zeidman | 717/123 |
| 7,526,477 B1 * | 4/2009 | Krause | 707/5 |
| 7,539,975 B2 * | 5/2009 | Atkin et al. | 717/118 |
| 7,542,989 B2 * | 6/2009 | Rudner | 1/1 |
| 7,568,109 B2 * | 7/2009 | Powell et al. | 713/187 |
| 7,747,873 B2 * | 6/2010 | Rabin et al. | 713/193 |
| 2001/0027522 A1 * | 10/2001 | Saito | 713/193 |
| 2002/0065781 A1 | 5/2002 | Hillegass et al. | |
| 2002/0138441 A1 | 9/2002 | Lopatic | |
| 2002/0138477 A1 | 9/2002 | Keiser | |
| 2002/0138764 A1 | 9/2002 | Jacobs et al. | |
| 2002/0162030 A1 | 10/2002 | Brezak et al. | |
| 2002/0188608 A1 | 12/2002 | Nelson et al. | |
| 2002/0194010 A1 | 12/2002 | Bergler et al. | |
| 2003/0018608 A1 * | 1/2003 | Rice et al. | 707/1 |
| 2003/0018891 A1 | 1/2003 | Hall et al. | |
| 2003/0074163 A1 | 4/2003 | Anand et al. | |
| 2003/0079174 A1 | 4/2003 | Hooks | |
| 2003/0101157 A1 * | 5/2003 | Sung | 707/1 |
| 2003/0125975 A1 | 7/2003 | Danz et al. | |
| 2003/0126456 A1 | 7/2003 | Birzer et al. | |
| 2003/0159055 A1 | 8/2003 | Robbins et al. | |
| 2003/0163684 A1 | 8/2003 | Fransdonk | |
| 2003/0167236 A1 | 9/2003 | Stefik et al. | |
| 2003/0172035 A1 | 9/2003 | Cronce et al. | |
| 2004/0068734 A1 | 4/2004 | Bond et al. | |
| 2004/0073789 A1 | 4/2004 | Powers | |
| 2004/0078434 A1 * | 4/2004 | Parker et al. | 709/206 |
| 2004/0117337 A1 * | 6/2004 | Beck et al. | 707/1 |
| 2004/0139340 A1 * | 7/2004 | Johnson et al. | 713/194 |
| 2004/0162827 A1 | 8/2004 | Nakano | |
| 2004/0243516 A1 * | 12/2004 | Zinssmeister et al. | 705/59 |
| 2004/0268214 A1 * | 12/2004 | Zinssmeister et al. | 715/500 |
| 2005/0015343 A1 | 1/2005 | Nagai et al. | |
| 2005/0039034 A1 | 2/2005 | Doyle et al. | |
| 2005/0060643 A1 | 3/2005 | Glass et al. | |
| 2005/0065930 A1 | 3/2005 | Swaminathan et al. | |
| 2005/0081151 A1 * | 4/2005 | Van Der Meer | 715/700 |
| 2005/0114840 A1 * | 5/2005 | Zeidman | 717/126 |
| 2005/0125358 A1 | 6/2005 | Levin et al. | |
| 2005/0125359 A1 | 6/2005 | Levin et al. | |
| 2005/0154904 A1 * | 7/2005 | Perepa et al. | 713/193 |
| 2005/0158697 A1 * | 7/2005 | Nelson et al. | 434/350 |
| 2005/0166094 A1 | 7/2005 | Blackwell et al. | |
| 2005/0216760 A1 * | 9/2005 | Rabin et al. | 713/200 |
| 2005/0216898 A1 | 9/2005 | Powell et al. | |
| 2005/0235342 A1 | 10/2005 | Ene-Pietrosanu et al. | |
| 2006/0004810 A1 * | 1/2006 | Atkin et al. | 707/101 |
| 2006/0005161 A1 * | 1/2006 | Atkin et al. | 717/106 |
| 2006/0005166 A1 * | 1/2006 | Atkin et al. | 717/120 |
| 2006/0005177 A1 * | 1/2006 | Atkin et al. | 717/151 |
| 2006/0015465 A1 | 1/2006 | Kume et al. | |
| 2006/0031364 A1 | 2/2006 | Hamilton et al. | |
| 2006/0031686 A1 | 2/2006 | Atallah et al. | |
| 2006/0037080 A1 * | 2/2006 | Maloof | 726/24 |
| 2006/0080314 A1 * | 4/2006 | Hubert et al. | 707/5 |
| 2006/0107070 A1 | 5/2006 | Rice et al. | |
| 2006/0119900 A1 * | 6/2006 | King et al. | 358/462 |
| 2006/0122983 A1 | 6/2006 | King et al. | |
| 2006/0155975 A1 | 7/2006 | Mueller | |
| 2006/0184549 A1 * | 8/2006 | Rowney et al. | 707/100 |
| 2006/0195540 A1 | 8/2006 | Hamilton et al. | |
| 2006/0212402 A1 * | 9/2006 | Lundberg et al. | 705/51 |
| 2007/0006160 A1 * | 1/2007 | Kunz et al. | 717/124 |
| 2007/0044157 A1 * | 2/2007 | Taguchi et al. | 726/27 |
| 2007/0058814 A1 * | 3/2007 | Robinson | 380/280 |
| 2007/0083510 A1 * | 4/2007 | McArdle | 707/6 |
| 2007/0089090 A1 * | 4/2007 | Riedl et al. | 717/120 |
| 2007/0124409 A1 * | 5/2007 | Sibert | 709/216 |
| 2007/0150387 A1 * | 6/2007 | Seubert et al. | 705/31 |
| 2007/0157311 A1 | 7/2007 | Meier et al. | |
| 2007/0162499 A1 * | 7/2007 | Menefee | 707/104.1 |
| 2007/0162890 A1 | 7/2007 | Meier et al. | |
| 2007/0174327 A1 * | 7/2007 | Rudner | 707/102 |
| 2007/0233538 A1 * | 10/2007 | Zpevak et al. | 705/8 |
| 2007/0240223 A1 * | 10/2007 | Zpevak et al. | 726/25 |
| 2007/0260550 A1 * | 11/2007 | Pieper et al. | 705/59 |
| 2007/0294610 A1 * | 12/2007 | Ching | 715/500 |
| 2007/0299825 A1 | 12/2007 | Rush et al. | |
| 2008/0052662 A1 * | 2/2008 | Zeidman | 717/100 |
| 2008/0215897 A1 | 9/2008 | Doyle et al. | |
| 2008/0270991 A1 * | 10/2008 | Zeidman | 717/126 |
| 2008/0304669 A1 | 12/2008 | Bugbee | |
| 2009/0089754 A1 * | 4/2009 | Zeidman | 717/123 |
| 2009/0106555 A1 * | 4/2009 | Buer | 713/176 |

OTHER PUBLICATIONS

"Cleanscape lint jump page," Cleanscape Software International, [retrieved Nov. 26, 2003], Retrieved from the Internet: <http://www.cleanscape.net/products/lintonline/login.html>, 1 page.

"Code Analysis Settings," Ascension Labs, LLC, [retrieved Nov. 26, 2003]. Retrieved from the Internet: <http://www.ascensionlabs.com/pbca_CodeAnalysisSettings.htm>, 1 page.

"Creating a LIDESC_TAGS string," Librock LIDESC Software License Analyzer and Compatibility Reporter, [retrieved Nov. 26, 2003], Retrieved from the Internet: <http://www.mibsoftware.com/librock/lidesc/tags.htm>, pp. 1-9.

"GPL Compliance Toolset," Metroworks, [retrieved Nov. 26, 2003], Retrieved from the Internet: <http://www.metrowerks.com/MW/Develop/Embedded/Linux/GPLCT.htm>, pp. 1-2.

"How LIDESC Identifies Licensing of a File" [retrieved Jul. 18, 2003], Retrieved from the Internet: <http://www.mibsoftware.com/librock/lidesc/stamp.htm>, 23 pages.

"License Database 1.0," TapTopFolder, [retrieved Nov. 26, 2003], Retrieved from the Internet: <http://www.systemconsulting.co.uk/index.php?page=software/products/licensedb.html>, 1 page.

"Licensing," Open Source Initiative OSI, [retrieved Nov. 26, 2003], Retrieved from the Internet: < http://www.opensource.org/licenses/index.php>, pp. 1-2.

"LIDESC: Librock License Awareness System," Librock LIDESC Software License Analyzer and Compatibility Reporter, [retrieved Nov. 26, 2003], Retrieved from the Internet: <http://www.mibsoftware.com/librock/lidesc>, pp. 1-2.

"Lineo launches 'anti-FUD' campaign with license ID tool," Lineo, Inc. [retrieved Nov. 26, 2003], Retrieved from the Internet: <http://www.linuxdevices.com/news/NS6538038/187.html>, pp. 1-4.

"Lineo's GPL Compliance Tool," Linux DevCenter, Oct. 4, 2001, http://linux.oreillynet.com/pub/a/linux/2001/10/04/lineo.html>, pp. 1-4.

"Microsoft Software Inventory Analyzer," Microsoft Software Asset Management, [retrieved Nov. 26 ,2003], Retrieved from the Internet: <http://www.microsoft.com/resources/sam/msia.mspx>, 1 page.

"Moss: A System for Detecting Software Plagiarism" [online]. Alex Aiken's Homepage [retrieved Nov. 4, 2005]. Retrieved from the Internet: <http://cs.berkeley.edu/~aiken/moss.html>, 2 pages.

"New utility helps prevent software license violations" NewsForge, OSDN Open Source Development Network, Inc., Apr. 24, 2002, [retrieved Nov. 26, 2003], Retrieved from the Internet: <http://www.linuxdevices.com/news/NS3340825769.html>, pp. 1-3.

"New utility helps prevent software license violations," NewsForge, OSDN Open Source Development Network, Inc., Apr. 23, 2002, [retrieved Nov. 26, 2003], Retrieved from the Internet: <http://www.newsforge.com/software/02/04/23/163211.shtml?tid=51>, pp. 1-3.

"News—Motorola picks Lineo for set-top box," ZDNet UK, Aug. 29, 2001, [retrieved Nov. 26, 2003], Retrieved from the Internet: <http://news.zdnet.co.uk/hardware/emergingtech/039020357,2093969,00.htm>, pp. 1-3.

"OSI Certification Mark and Program" Open Source Initiative OSI, [retrieved Nov. 26, 2003], Retrieved from the Internet: <http://www.opensource.org/docs/certificationmark.php>, pp. 1-5.

"PB Code Analyzer," Ascension Labs, LLC, [retrieved Nov. 26, 2003], Retrieved from the Internet: <http://www.ascensionlabs.com/pbcodeanalyzer.htm>, pp. 1-5.

"Products," TapTopFolder, [retrieved Nov. 26, 2003], Retrieved from the Internet: <http://www.systemconsulting.co.uk/index.php?page=software/products.html>, 1 page.

"Query FTP Software License Database," The U.T. Houston Database of FTP Software Licenses, [retrieved Nov. 26, 2003], Retrieved from the Internet: <http://www.uth.tmc.edu/iaims/network/ftp.html>, 1 page.

"The Attribution Assurance License: Licensing," Open Source Initiative OSI, [retrieved Nov. 26, 2003], Retrieved from the Internet: <http://www.opensource.org/licenses/attribution.php>, pp. 1-3.

"The Open Source Definition," Open Source Initiative OSI, [retrieved Nov. 26, 2003], Retrieved from the Internet: <http://www.opensource.org/docs/definition.php>, pp. 1-4.

"Various Licenses and Comments about Them" GNU ProjectFree Software Foundation (FSF), [retrieved Nov. 26, 2003], Retrieved from the Internet: <http://www.fsf.orgllicenses/license-list.html>, pp. 1-15.

"Write Me 4.1," TapTopFolder, [retrieved Nov. 26, 2003], Retrieved from the Internet: <http://www.systemconsulting.co.uk/index.php?page=software/products/writeme.html>, 1 page.

Arsenault et al., "Securely Available Credentials—Requirements", Network Working Group Request for Comments: 3157, Aug. 2001, [retrieved Nov. 26, 2003], Retrieved from the Internet: <http://ftp.rfc-editor.org/in-notes/rfc3157.txt>, pp. 1-19.

Cohen, "Recursive Hashing Functions for n-Grams", ACM Transactions on Information Systems, vol. 15, No. 3, Jul. 1997, pp. 291-320.

Cole et al. "Verifying Candidate Matches in Sparse and Wildcard Matching" [online]. Montreal, Quebec, Canada, STOC 02, May 19, 2002-May 21, 2002 [retrieved Oct. 30, 2007]. Retrieved from the Internet: <www.citeseer.org>, 10 pages.

Damashek, "Gauging Similarity with n-Grams: Language-Independent Categorization of Text", Science, New Series, vol. 267, No. 5199, Feb. 10, 1995, pp. 843-848.

Eastlake et al, "US Secure Hash Algorithm 1 (SHA 1)", Network Working Group Request for Comments: 3174, Sep. 2001, [retrieved Nov. 26 ,2003]. Retrieved from the Internet: <http://ftp.rfc-editor.orglin-notes/rfc3174.txt>, pp. 1-21.

Fougner, "Public Key Standards and Licenses", Network Working Group Request for Comments: 1170, Jan. 1991, [retrieved Nov. 26, 2003], Retrieved from the Internet: <http://fto.rfc-editor.org/in-notes/rfc1170.txt>, pp. 1-2.

Gomulkiewicz, "How Copyleft Uses License Rights to Succeed in the Open Source Software Revolution and the Implications for Article 2B," Houston Law Review, 36:179, 1999, retrieved from HCUL.doc on Oct. 2, 2003, pp. 179-194.

Heckel et al., "A Technique for Isolating Differences Between Files", Communications of the ACM, vol. 21, No. 4, Apr. 1978, pp. 264-268.

Huitema, "An Experiment in DNS Based IP Routing," Network Working Group Request for Comments: 1383, Dec. 1992, [retrieved Nov. 26, 2003], Retrieved from the Internet: <http://ftp.rfc-editor.org/in-notes/rfc1383.txt>, pp. 1-14.

International Search Report for related PCT Application No. PCT/US2007/011022, mailed Nov. 12, 2007, 4 pages.

Johnson, "Identifying redundancy in source code using fingerprints," IBM Centre for Advanced Studies Conference, Proceedings of the 1993 conference of the Centre for Advanced Studies on Collaborative research: software engineering—vol. 1, 1993, pp. 171-183.

Kamps et al. "Best Match Querying form DocumentCentric XML" [online]. Seventh International Workshop on the Web and Databases, Amsterdam, Netherlands, (WEBDB 2004), Jun. 17, 2004-Jun. 18, 2004 [retrieved on Oct. 30, 2007]. Retrieved from the Internet: <http://staff.science.uva.nl/{mdr/Publications/Files/webdb2004.pdf>, pp. 55-60.

Meziane et al. "A Document Management Methodology Based on Similarity Contents." Elsevier, 2003, Salford, United Kingdom, Information Sciences vol. 158 (2004), pp. 15-36.

Office Action issued in related U.S. Appl. No. 10/728,173, mailed Jan. 28, 2008, 6 pages.

Office Action issued in related U.S. Appl. No. 10/728,174, mailed Jan. 25, 2008, 10 pages.

Office Action issued in related U.S. Appl. No. 11/084,063, mailed Sep. 21, 2008, 15 pages.

Pethia et al., "Guidelines for the Secure Operation of the Internet", Network Working Group Request for Comments: 1281, Nov. 1991, [retrieved Nov. 26, 2003], Retrieved from the Internet: <http://ftp.rfc-editor.org/in-notes/rfc1281.txt>, pp. 1-10.

Rescorla et al., "The Secure HyperText Transfer Protocol," Network Working Group Request for Comments: 2660, Aug. 1999, [retrieved Nov. 26, 2003], Retrieved from the Internet: <http://ftp.rfc-editor.org/in-notes/rfc2660.txt>, pp. 1-43.

Rivest, The MD5 Message-Digest Algorithm, Network Working Group Request for Comments: 1321, Apr. 1992, [retrieved Nov. 26, 2003], Retrieved from the Internet: <http://ftp.rfc-editor org/in-notes/rfc1321.txt>, pp. 1-20.

Self et al. "[fsl discuss] Automatic reporting of license terms," Apr. 28, 2002, [retrieved Nov. 26, 2003], Retrieved from the Internet: <http://lists.alt.org/pipermail/fsl-discuss/2002-April/000312.html>, pp. 1-3.

Self et al. "[fsl-discuss] Automatic reporting of license terms," Apr. 25, 2002, [retrieved Nov. 26, 2003], Retrieved from the Internet: <http://lists.alt.org/pipermail/fsl-discuss/2002-April/000309.html>, pp. 1-2.

Si et al., "Check: A Document Plagiarism Detection System", Symposium on Applied Computing, Proceedings of the 1997 ACM symposium on Applied computing, 1997, pp. 70-77.

Verco et al., "Plagiarism á la Mode: A Comparison of Automated Systems for Detecting Suspected Plagiarism", The Computer Journal, vol. 39, No. 9, 1996, pp. 741-750.

Written Opinion for related PCT Application No. PCT/US2004/040453, mailed Jun. 4 ,2006, 6 pages.

Written Opinion for related PCT Application No. PCT/US2006/008369, mailed Sep. 18, 2007, 4 pages.

Written Opinion for related PCT Application No. PCT/US2007/011022, mailed Nov. 12, 2007, 8 pages.

International Search Report for PCT Application No. PCT/US2007/000272, mailed Nov. 19, 2008, 2 pages.

Written Opinion for PCT Application No. PCT/US2007/000272, mailed Nov. 19, 2008, 5 pages.

Final Office Action issued in related U.S. Appl. No. 10/728,173, mailed Jan. 23, 2009, 11 pages.

Office Action issued in related U.S. Appl. No. 11/429,928 mailed Jan. 27, 2008, 11 pages.

Written Opinion for PCT Application No. PCT/US2007/021648, mailed Jan. 30, 2009, 5 pages.

International Search Report for PCT Application No. PCT/US2007/021648, mailed Jan. 30, 2009, 4 pages.

Notice of Allowance issued in related U.S. Appl. No. 10/728,174 dated Feb. 4, 2009, 11 pages.

"TeleKnowledge" M2 Presswire, Coventry: Jul. 1, 2002, 3 pages.

Examination Report for related European Application No. 06737533.7, mailed Jan. 15, 2008, 2 pages.

Office Action issued in related U.S. Appl. No. 11/326,806, mailed Feb. 26, 2009, 13 pages.

Office Action issued in related U.S. Appl. No. 11/580,220, mailed Feb. 24, 2009, 8 pages.

Menezes, Alfred J., "Handbook of Applied Cryptography", copyright 1997 by CRC Press LLC, pp. 22-23.

Office Action issued in related U.S. Appl. No. 10/084,063, mailed May 1, 2008, 15 pages.

Examination Report for European Application No. 06737533.7, mailed Aug. 28, 2008, 6 pages.

Office Action issued in related U.S. Appl. No. 11/084,063, mailed Nov. 3, 2008, 17 pages.

Clough, "Plagiarism in natural and programming languages: an overview of current tools and technologies", <http://www1.compaq.com/pressrelease/0,1494,wp%7E14583_2lob%7E29892_1_1.00.html>, pp. 1-31, Jun. 2000.

Prechelt et al., "Finding plagiarisms among a set of programs with JPlag", Resubmission to J. of Universal Computer Science, Nov. 28, 2001, <http://www.jucs.org>, pp. 1-23.

Schleimer et al., "Winnowing: Local Algorithms for Document Fingerprinting", pp. 76-85.

Whale, "Identification of Program Similarity in Large Populations", *The Computer Journal*, 33(2):140-146 (1990).

Wise et al., "YAP3: Improved Detection of Similarities in Computer Program and Other Texts," pp. 130-134.

Farringdon, Jill M., *Introduction to Analysing for Authorship: A Guide to the Cusum Technique*, Retrieved from Website: <http://members.aol.com/qsums/>, Introduction link, web pages dated Oct. 13, 2004, Retrieved via the Wayback Machine: <www.archive.org>, 11 pages.

Invitation Pursuant to Article 94(3) and Rule 71(1) EPC for European Patent Application No. 06737533.7 dated Jun. 2, 2008, 2 pages.

Office Action issued in related U.S. Appl. No. 11/429,928 mailed Jun. 27, 2008, 14 pages.

Office Action issued in related U.S. Appl. No. 11/580,220, mailed Jul. 9, 2008, 9 pages.

Notice of Allowance issued in U.S. Appl. No. 11/580,220, mailed Nov. 2, 2009, 10 pages.

* cited by examiner

FIG. 3

○ Black Duck - Algorithm Matches View - Mozilla Firefox

File  Edit  View  Go  Bookmarks  Tools  Help blackduck                                                    Hello Demo User
                                                                       Help
                                                                      Logout exportIP™

| Select Project | Algorithm Matches |

Getting Started
My Projects                    Algorithm Matches                                          Select Project • Print
Analyze My Code                Please review and identify all matches between your code and the encryption algorithm code in the KB.
> Identify Matches             Click on the Identify link to open the Identification dialog and to view each of the algorithm match saved examples.
  • select project             Click on the Go! link to open the file comparison tool with all the algorithm match saved examples.
Searches                       Click on the filename to open a window with a listing of all algorithm matches.
Reports                        Project: Patent Demo   _501_
Notification Manager
Review Manager                 Files With Algorithm Matches                                                             ?
KnowledgeBase (KB)
                               | File Name  | Matches | Compare | Action   |
KB Encryption Algorithms       | blowfish.c | 20      | Go!     | Identify |
KB Encryption Libraries        | sha1.c     | 1       | Go!     | Identify |
KB Searches                    | sha256.c   | 9       | Go!     | Identify |
Codeprint My                   | tiger.c    | 2       | Go!     | Identify |
Encryption Code
Administration                 From any algorithm              ▶

My Profile                     From any encryption library    ▶         Legend
Downloads                                                               I:   Identified at file level
Product Registration
Policy Manager                 unidentified matches  ▶    Go
Special Functions Standard Encryption            Please identify all algorithm matches before moving to the next page.
Algorithm Manager

File Comparison Tool: blowfish.c

File  Tools  Help

[blowfish.c] [blowfish.c] [blowfish.c] [bfpi.h]

Left pane (603):

```
   Name:                blowfish.c
   Project:             Patent Demo
   Encryption Algorithm:
   Project homepage:

1  # include "crypt.h"
2
3  static const unsigned long ORIG_P(16 + 2) = (
4    0x240F6A88L, 0x85A308D0L, 0x12198A2BL, 0x03707344L,
5    0xA4093822L, 0x299F31D0L, 0x082EFA98L, 0xEC4E6C89L,
6    0x452821E6L, 0x38D01377L, 0xBE5466CIL, 0x34E90C8CL,
7    0xC0AC29B7L, 0xC97C50DDL, 0x0F84D5B5L, 0xB5470917L,
8    0x9210DSD9L, 0x8979FB1BL
9    );
10
11 static const unsigned long ORIG_S(4)(256) = (
12   0xD1210BA6L, 0x98DFB5ACL, 0x2FFD72DBL, 0xD01ADFB7L,
13   0xB8E1AFEDL, 0x68267E96L, 0xBA7C9045L, 0xF12C7F99L,
14   0x24A19947L, 0xB3916CF7L, 0x0801F2E2L, 0x856EFC16L,
15   0x626920D6L, 0x71574E69L, 0xA438FEA3L, 0xF4933D7EL,
16   0x0D95748FL, 0x726EB658L, 0x718BCD5BL, 0x821S4AEEL,
17   0x7B54A41DL, 0xC25A59B5L, 0x9C30D539L, 0x2AF26013L,
18   0xC3D1B023L, 0x286085F0L, 0xCA417918L, 0xB8DB38EFL,
19   0x8E79DCB0L, 0x602A180EL, 0x6C9E0E8BL, 0xB01E8A3EL,
```

Right pane (605):

```
   Name:                bfpi.h
   Project:             cryplib implementation of Blowfish with user configu
   Encryption Algorithm: Blowfish with user configurable key
   Project homepage:

47  *OR SERVICES;LOSS OR USE, DATA, OR PROFITS; OR BUSINE
48  *HOWEVER CAUSED AND ON ANY THEORY OF LIABILITY,
49  *LIABILITY, OR PORT (INCLUDING NEGLIGENCE OR OTHERWIS
50  *OUT OF THE USE OF THIS SOFTWARE, EVEN IF ADVISED OF
51  *SUCH DAMAGE.
52  *
53  *The license and distribution terms for any publically available
54  *derivative of this code cannot be changed, i.e. this code cannot
55  *copied and put under another distribution license
56  *(including the GNU Public License.)
57
58  static const BF_KEY bf_init= (
59
60   (
61    0x240F6a88L, 0x85x308d3L, 0x1319Ba2eL, 0x03707344L,
62    0xa4093822L, 0x299f31d0L, 0x082efa98L, 0xec4e6c89L,
63    0x452821e6L, 0x38d01377L, 0xbe5466cfL, 0x34e90c6cL,
64    0xc0ac29b7L, 0xc97c50ddL, 0x3784d5b5L, 0xb5470917L,
65    0x9216a5d9L, 0x8979fbib
``` blackduck exportIP™

Getting Started
My Projects
Analyze My Code
Identify Matches
> Searches
• select project
Reports
Notification Manager
Review Manager
KnowledgeBase (KB)
KB Encryption Algorithms
KB Encryption Libraries
KB Searches
Codeprint My
Encryption Code
Administration
My Profile
Downloads
Product Registration
Policy Manager
Special Functions
Standard Encryption
Algorithm Manager Hello Demo User
Help
Logout

| Select Project | Search Summary | Search Results |

String Search Result
Project: Patent Demo

Select Project • Print

Search detail for: OpenSSL RSA functions 1

Search with all the words:
with at least one of the words: "RSA blinding ob" "RSA check key" "RSA flags" "RSA free" "RSA generate key" "RSA get default method" "RSA get ex data" "RSA get ex new index" "rsa get method" "RSA new method" "RSA new" "RSA null method" "RSA print fp" "RSA print" "RSA private decrypt" "RSA private encrypt" "RSA public decrypt" "RSA public encrypt" "RSA set default method" "RSA set ex data" "RSA set method" "RSA sign_ASN1 OCTET STRING" "RSA size" "RSA verify" "RSA verify_ASN1 OCTET STRING" "RSA_PKCS1 SSLeay"
without the words:

String Search Result for: OpenSSL RSA functions 1   (2 / 2)

| File Name | Context | Show Action |
|---|---|---|
| crypt.h | int inlen unsigned char out int outlen extern void rsd free struct rsa key key extern int rsa encrypt unsigned char out int outlen struct rsa key key extern int rsa sign unsigned char in int inlen unsigned char out int outlen pmg int vping struck rsa key key extern int rsa verify unsigned char sig unsigned char msg int inlen int stat | Go! identify |
| test.c | return printf RSA Export takes d bytes n x rsa free key if rsa import out key CRYPT ERROR printf Error error return printf s n y d pass Fail rsa free key void base64_test void unsigned char | Go! identify |

Legend
I: identified at file level

Once you've done identifying these string matches, go back to the list of all Search Matches.

FIG. 9

Identification

Review the detected matches shown at the bottom of this page. Identify this match by selecting the item from the drop-down list that best identifies the library and key length used in the code, then click the submit button to save your identification.

○ Code in this file does not implement or call an encryption algorithm or is not included in the shipped product. This file does not require further analysis. Add a comment to explain.

⦿ Code in this file comes from a different encryption library in key KnowledgeBase:
   [RSA BSAFE Secure WS implementation of RSA with key <= 512 bits. ▼]

○ Code in this file comes from a custom algorithm implementation:
   Library Name: [        ]
   Home Page: [        ]
   Algorithm: [--Select from Encryption Algorithms ▼]

Algorithm comments (optional):
[                    ]

Detailed comment about your choice:
[                    ]

This comment will be displayed in detailed views such as the work record report.

[Submit]

Black Duck - Project Settings - Mozilla Firefox

File  Edit  View  Go  Bookmarks  Tools  Help

Hello Demo User
Help
Logout blackduck exportIP™

Getting Started
My Projects
Analyze My Code
Identify Matches
Searches
> Reports
 • select project
 Notification Manager
 Review Manager
KnowledgeBase (KB)
 KB Encryption Algorithms
 KB Encryption Libraries
 KB Searches
 Codeprint My Encryption Code
Administration
 My Profile
 Downloads
 Product Registration
 Policy Manager
Special Functions
 Standard Encryption Algorithm Manager

| Select Project | Project Settings |

Project Settings
Project: Patent Demo

Refresh Report

There are 55 Search matches still unidentified. Please examine all search matches before processing. Before moving on to the report, please make sure the following project settings are correct, as they will determine the results of this analysis.

Special Options

☐ Self-Classified as 5x992: Do you believe your product fits in the 992 xxxxxx of the ECCN matrix? ← 1201

☐ Open Cryptographic Interface: Does your your product contain an Open Cryptographic Interface? ← 1203

Product Details

Product Type: What type of product is this?
[For Sale ▼] ← 1205

Intended Distribution: Where this software will be sold or distributed?
[EU License Free Zone (LFZ) ▼] ← 1207

☐ Mass Market: Will this product be sold on the Mass Market? ← 1209

☐ Outsourced Project: Will this product be worked on by an outsourcing firm (prior to release)? ← 1211

☐ Open Source Project: Will all source code in this product be released as Open Source? ← 1213

☐ Beta Test: Is the current distribution for beta-testing only?

☐ Internal Development: Is this product used only for development of other new products? ← 1215

Intended Distribution
See the definition of Foreign Subsidiaries of US Companies.
See the list of countries in the EU License Free Zone (LFZ).
See the definition of Government End-Users.
See the list of embargoes countries.

[Save Settings and View Report]

Legal Information • Contact Black Duck
Copyright © 2004-6 Black Duck Software Inc. • All right reserved

FIG. 13

Black Duck - Report - Mozilla Firefox

File  Edit  View  Go  Bookmarks  Tools  Help blackduck

Hello Demo User
Help
Logout

| Select Project | Project Settings | Report | Work Records Report | History | exportIP™

- Getting Started
- My Projects
- Analyze My Code
- Identify Matches
- Searches
- > Reports
  - • select project
  - Notification Manager
  - Review Manager

KnowledgeBase (KB)
- KB Encryption Algorithms
- KB Encryption Libraries
- KB Searches
- Codeprint My Encryption Code

Administration

- My Profile
- Downloads
- Product Registration
- Policy Manager

Special Functions

- Standard Encryption Algorithm Manager

---

Report

Confidential

Select Project
Refresh Report
Printable View
For Internal Use Only

DISCLAIMER: This report was created using Black Duck's exportIP™ encryption export compliance management products and services. The results reflect the user's analysis and decision making. Black Duck cannot confirm and makes no representation or warranty to its customers or to any third party regarding the results obtained by use of this product or the contents of this report.

Export Restrictions based on Input Given:   ?

You MUST NOT ship this code to any of the Restricted Individuals, Organizations, and Countries.
The strongest encryption algorithm found was a symmetric key encryption algorithm using a weak symmetric key (0-56 bits).
Under EAR 742.15(b)(1)(ii), you may ship without a license (5x992 NLR) after submitting a notification. The only cryptography eligible for this exception is that with key lengths <= 56 bit symmetric key, <= 112 bit elliptic key, <= 512 bit asymmetric key. ← 1301
Exports are not authorized to Embargoed Countries.

☑ You MUST notify the appropriate agencies before shipping.

go to top

Encryption Algorithms Identified   ?

| Algorithm |
|---|
| Blowfish with Key <= 56 bits |
| Algorithm Type:     Symmetric Key Cipher |
| Key length:           0-56 Bits |
| Source Code Origin: Crypt implementation of Blowfish with key <= 56 bits |

← 1303 go to top

DISCLAIMER: This report was created using Black Duck's exportIP™ encryption export compliance management products and services. The results reflect the user's analysis and decision making. Black Duck cannot confirm and makes no representation or warranty to its customers or to any third party regarding the results obtained by use of this product or the contents of this report.

Important Notice Regarding The Contents Of The Report

FIG. 15

Black Duck - Preview Notification - Mozilla Firefox

File  Edit  View  Go  Bookmarks  Tools  Help blackduck

Hello Demo User
Help
Logout

| Select Project | Profile | Preview | exportIP™

- Getting Started
- My Projects
- Analyze My Code
- Identify Matches
- Searches
- Reports
- > Notification Manager
  - • select project
  - Review Manager
- KnowledgeBase (KB)
- KB Encryption Algorithms
- KB Encryption Libraries
- KB Searches
- Codeprint My Encryption Code
- Administration
- My Profile
- Downloads
- Product Registration
- Policy Manager
- Special Functions
- Standard Encryption Algorithm Manager Preview Notification - Not For Editing 1501 ⟶ Send to the BIS and NSA

PLEASE READ

This email will be sent to the NSA and BIS when you hit send. Make certain it contains all the information necessary before clicking on the Send link. Click here to go back and edit the form. If you wish to send this notification to an alternate address for further review, please input the email address at the bottom of this page and click the corresponding button.

From: foo@bds.com
To: daveg@ blackducksoftware.com
cc: foo@bds.com
subject: NLR NOTIFICATION
--text follows this line--
SUBMISSION TYPE:       NLR
SUBMITTED BY:          Demo User
SUBMITTED FOR:
POINT OF CONTACT:      Demo User
PHONE and/or FAX:      / /
MANUFACTURER:
PRODUCT NAME/MODEL #: Patent Demo
ECCN:                  CD992

RESPONSES TO QURSITIONS (a) - (e) OF SUPPLEMENT 6 TO PART 742 OF THE EAR:
(a) State the name of the encryption item being submitted for review.
Patent Demo
(b) State that a duplicate copy has been sent to the ENC Encryption Request Coordinator.
A duplicate copy has been sent to the ENC Encryption Request Coordinator.
(c) For review requests for a commodity or software, provide the following information:
(1) Description of all the symmetric and asymmetric encryption algorithms and key lengths and how the algorithms are used. Specify which encryption modes are suppor

FIG. 16

Encryption Algorithms identified

Algorithm

Blowfish with key <= 56 bits
Algorithm Type: Symmetric Key Cipher
Key Length: 0 - 56 Bits
Source Code Origin: Crypt implementation of Blowfish with key <= 56 bits
cryptlib implementation of Blowfish with key <= 56 bits
CTC Lib implementation of Blowfish with key <= 56 bits
egocrew implementation of Blowfish with key <= 56 bits
Funet-Blowfish implementation of Blowfish with key <= 56 bits
MCrypt implementation of Blowfish with key <= 56 bits
SSLeav implementation of Blowfish with key <= 56 bits

SHA (0.1.224.256.384.512)
Algorithm Type: Cryptographic Hash
Key Length: > 64 Bits
Source Code Origin: Crypt implementation of SHA (0.1.224.256.384.512)
cryptlib implementation of SHA (0.1.224.256.384.512)
egocrew implementation of SHA (0.1.224.256.384.512)
LibTomCrypt implementation of SHA (0.1.224.256.384.512)
Mhash implementation of SHA (0.1.224.256.384.512)
Nettle implementation of SHA (0.1.224.256.384.512)
OpenSSL implementation of SHA (0.1.224.256.384.512)
Python Cryptography implementation of SHA (0.1.224.256.384.512)

Tiger
Algorithm Type: Cryptographic Hash
Key Length: > 64 Bits
Source Code Origin: Crypt implementation of Tiger
cryptlib implementation of Tiger

Blowfish with key > 56 and <= 64 bits
Algorithm Type: Symmetric Key Cipher
Key Length: 57 - 64 Bits
Source Code Origin: Crypt implementation of Blowfish with key > 56 and <= 64 bits
cryptlib implementation of Blowfish with key > 56 and <= 64 bits
CTC Lib implementation of Blowfish with key > 56 and <= 64 bits
egocrew implementation of Blowfish with key > 56 and <= 64 bits
Funet-Blowfish implementation of Blowfish with key > 56 and <= 64 bits
MCrypt implementation of Blowfish with key > 56 and <= 64 bits
SSLeav implementation of Blowfish with key > 56 and <= 64 bits

Blowfish with key > 64 bits
Algorithm Type: Symmetric Key Cipher
Key Length: > 64 Bits
Source Code Origin: Crypt implementation of Blowfish with key > 64 bits
cryptlib implementation of Blowfish with key > 64 bits
CTC Lib implementation of Blowfish with key > 64 bits
egocrew implementation of Blowfish with key > 64 bits

Black Duck - History - Mozilla Firefox

File Edit View Go Bookmarks Tools Help blackduck

Hello Demo User
Help
Logout exportIP™ | Select Project | Xxxxxxxtings | Report | Xxxxx Records xxxxx | History

- Getting Started
- My Projects
- Analyze My Code
- Identify Matches
- Searches
- > Reports
  - • select project
  - Notification Manager
  - Review Manager
- KnowledgeBase (KB)
- KB Encryption Algorithms
- KB Encryption Libraries
- KB Searches
- Encryption Algorithm Manager
- My KB
  - Encryption Algorithms
  - KB Encryption Algorithms Modifier
  - KB Encryption Library Modifier
  - Codeprint My Encryption Code
- Administration
- My Profile
- Downloads
- Product Registration
- Policy Manager History for Patent Demo

Summary over Time

| Date | Files analyzed | Files with algorithm matches | Libraries used in source code | Components | Algorithms used |
|---|---|---|---|---|---|
| Current 2006.09.28 102902 (EDT) | 20 | 4 | 4 | 1 | 3 |
|  | 20 | 4 | 39 | 1 | 7 |

Legal Information • Contact Black Duck
Copyright © 2004-6 Black Duck Software Inc. • All right reserved blackduck

Work Records for data uploaded on 2006.09.28 1029 (EDT)

Confidential  For Internal Use Only
DISCLAIMER: This report was created using Black Duck's exportIP™ encryption export compliance management products and services. The results reflect the user's analysis and decision making. Black Duck cannot confirm and makes no representation or warranty to its customers or to any third party regarding the results obtained by use of this product or the contents of this report.

Outstanding Code Matches

| My File | Matched Project | Matched File | Used by |
|---|---|---|---|
| blowfish.c | | | My Code |
| — exact match | Crypt implementation of Blowfish with key <= 56 bits | blowfish.c | |
| — exact match | Crypt implementation of Blowfish with key > 56 and <= 64 bits | blowfish.c | |
| — exact match | Crypt implementation of Blowfish with key > 64 bits | blowfish.c | |
| — exact match | Crypt implementation of Blowfish with user configurable key | blowfish.c | |
| ~ line 4 | cryptlib implementation of Blowfish with user configurable key | bfpi.h, line 61 | |

No saved examples:
partial match — cryptlib implementation of Blowfish with key <= 56 bits, cryptlib implementation of Blowfish with key > 56 and <= 64 bits, cryptlib implementation of Blowfish with key > 64 bits, CTC Lib implementation of Blowfish with key <= 56 bits, CTC Lib implementation of Blowfish with key > 56 and <= 64 bits, CTC Lib implementation of Blowfish with key > 64 bits, CTC Lib implementation of Blowfish with user configurable key, egocrew implementation of Blowfish with key <= 56 bits, egocrew implementation of Blowfish with key > 56 and <= 64 bits, egocrew implementation of Blowfish with user configurable key, Funet-Blowfish implementation of Blowfish with key <= 56 bits, Funet-Blowfish implementation of Blowfish with key > 56 and <= 64 bits, Funet-Blowfish implementation of Blowfish with user configurable key, MCrypt implementation of Blowfish with key <= 56 bits, MCrypt implementation of Blowfish with key > 56 and <= 64 bits, MCrypt implementation of Blowfish with key > 64 bits, SSLeay implementation of Blowfish with key <= 56 bits, SSLeay implementation of Blowfish with key > 64 bits, SSLeay implementation of Blowfish with user configurable key.

| sha1.c | | | My Code |
|---|---|---|---|
| — exact match | Crypt implementation of SHA (0.1.224.256.384.512 | sha1.c | |

| sha256.c | | | My Code |
|---|---|---|---|
| — exact match | Crypt implementation of SHA (0.1.224.256.384.512 | sha256.c | |

FIG. 19

METHODS AND APPARATUS FOR AUTOMATED EXPORT COMPLIANCE

RELATED APPLICATIONS

This application is a continuation of, and claims the benefit of, and priority to, U.S. patent application Ser. No. 11/580,220, filed on Oct. 12, 2006, entitled, "Software Algorithm Identification," incorporated herein by reference.

TECHNICAL FIELD

The invention generally relates to systems and methods for compliance with export regulations. More particularly, the invention relates to methods and systems for identifying content that is subject to export controls, and facilitating compliance with such export controls.

BACKGROUND

In the United States and in other countries, government controls have been placed on certain technology to prevent transfer to foreign nationals. The regulations governing such restrictions generally are complicated, at least in part because they depend on the technology in question and the nationality of potential recipients. Penalties for non-compliance may be civil and/or criminal, and so may include fines and imprisonment as well as loss of export privileges.

In the case of software, certain types of software, and software containing or using certain types of algorithms, may be subject to export controls. For example, software for use in or with military weapons may be included in a category of items that may not be exported to certain countries without government approval. Software not intended for military use still may be restricted, for example, if it includes certain types of encryption technology. This encryption technology may be publicly available, and export may be allowed, but only upon completion of required documents and/or approval.

At least in part because of the complexity of the rules, a company that has a software product or a product that contains computer software, particularly a non-military product, may have difficulty determining the export controls that are applicable to their product. The company may not even know what to look for, let alone understand the implications of the software tools and algorithms included in the company's software. This problem is compounded by the availability of encryption technology on internet web sites, such that it is possible for product developers to download and incorporate encryption technology into a company's products without knowledge or approval of management.

SUMMARY OF THE INVENTION

In general, in one aspect, the invention relates to methods and systems for identifying content that may be subject to export controls, and facilitating compliance with such requirements. In some embodiments, a method for determining export requirements for a content file may include examining a content file to identify content used by or included in the content file that is subject to export control, determining, in response to the identified content, export requirements that are applicable to the content file, and providing an indication of the determined export requirements.

The content file(s) under examination may be, for example, one or more of a software element (e.g., a source code file and/or an object code file for an application program, a library, and so on), a multimedia presentation, a video segment, an audio segment, a textual representation, a work of art, a visual representation. Regions of interest in the content file may be identified, where the regions of interest may be sections of the content files that are indicative of content that may be subject to export control. The examination may be accomplished with a tool, such as an export compliance tool, as described here.

In general, in one aspect, the invention features a method for export compliance. The method includes conducting a computer-assisted examination of one or more content files. The method includes, in response to the examination results, identifying content used by or included in the one or more content files that is indicative of content subject to export control. The method includes determining, in response to the identified content, export requirements applicable to the one or more content files. The method includes providing an indication of the determined export requirements.

The method may include receiving information about the expected use of the content file. This information may be received before or after one or more of the other steps. The determining step may include making a determination in response to the identified content and the received information regarding expected use.

The content files may be computer software files (e.g., source code and/or object code). The content subject to export control may be an encryption algorithm.

In one embodiment, the content subject to export control may be identified by presenting examination results to a user. In another embodiment, the content subject to export control may be identified without user intervention.

Various embodiments may include some or all of the following features.

The method may include identifying a first portion of the examined content file that is similar to a portion of a first comparison content file, where the comparison content file is subject to export control. The method may include identifying a second portion of an examined content file, determining whether the first portion and the second portion of the examined content file match the same comparison file. The method may include considering one or two or more of the following, alone or in combination: information about other matches with the collection associated with the comparison files, information about directory and/or file names associated with comparison files, information about date information associated with the comparison files, version control and/or content management information, build information (e.g., information based on make files, build scripts, unit tests, and so on), specific words or text strings included in a file, a critical mass of words or text strings included in a file, data values included as data, author information, structure of code, the use of certain mathematical operations, information on standards implemented, license information associated with the comparison files, an indicator that a comparison is believed to be an original, and an indicator that a comparison is not an original. Each type of information may be used separately and/or in combination with other information, mentioned here or otherwise.

Similarity may be determined by any suitable technique or techniques, alone or in combination with others. A few examples include, but are not limited to comparing tokens, comparing content, comparing data derived from content, comparing text strings, and comparing license text, comparing algorithmic operation, comparing exact strings, and comparing static data.

The portions may be portions of content in any form, such as binary, ascii, etc., and may be formatted in any manner, such as into records, or subgroups, lists, and so on. In various embodiments, there may be three, four, or more portions that match portions of comparison files. For example, the method may include identifying a third portion of the examined content file that is similar to a portion of a third comparison content file, and determining whether one of the first portion, the second portion and the third portion of the examined content file is a superset of one or more of the others, and if so, determining that the portion of the comparison file that matches the superset is a best match with the first content file. This may be extended to a fourth, fifth, sixth, and so on.

In various embodiments, a method may include aggregating the determined export requirements with export requirements applicable to other content files. In various embodiments, a method may include aggregating the determined export requirements with export requirements obtained from publicly available export information.

In general, in another aspect, the invention relates to a system for facilitating export compliance. The system includes an examination subsystem for performing an examination of one or more content files, and identification subsystem for identifying in response to examination results content used by or included in the one or more content files that is indicative of content subject to export control, a determination subsystem for determining in response to the identified content export requirements applicable to the one or more content files, and an indication subsystem for providing an indication of the determined export requirements.

In general, in another aspect, the invention relates to determining export requirements for a software program, by examining a software program, identifying a portion of the software program indicative of encryption technology included in the software program, determining export requirements associated with the encryption technology indicated by the identified portion of the software program; and providing an indication of the determined export requirements for the software program.

In general, in another aspect, the invention relates to a method for examining a software program to identify an algorithm used in the software program. The method may include identifying a first portion of the software program that is similar to a portion of a comparison software program. The method may include determining that the first portion is associated with an algorithm. The method may include providing an indication that the software program uses the determined algorithm. There may be one, two, or more different algorithms used, and two or more algorithms may be used in combination.

In various embodiments, the algorithm may be subject to export controls. The method may further include analysis of the algorithm, or data used by the algorithm, to determine characteristics of the implementation of the algorithm. For example, the method may include analysis of the algorithm to determine the key length of key data employed by the algorithm.

In general, in one aspect, the invention relates to an export compliance tool that is used in combination with a content management tool. The content management tool may be used, for example, to provide license compliance information to a user. The export compliance tool may be used as described here to provide export compliance information. In one embodiment, the examination of files described here takes place as part of a compliance effort that includes both license compliance and export compliance. Information, reports, and documentation are provided that include both license compliance information and export compliance information. It should be understood that there may be efficiency benefits of such a tool, in that the examination of content may only need to be performed once, with results that are applicable to both license compliance and export compliance.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 3-FIG. 19 depict screen displays for an exemplary embodiment of an export compliance system.

DESCRIPTION

Figure 1:
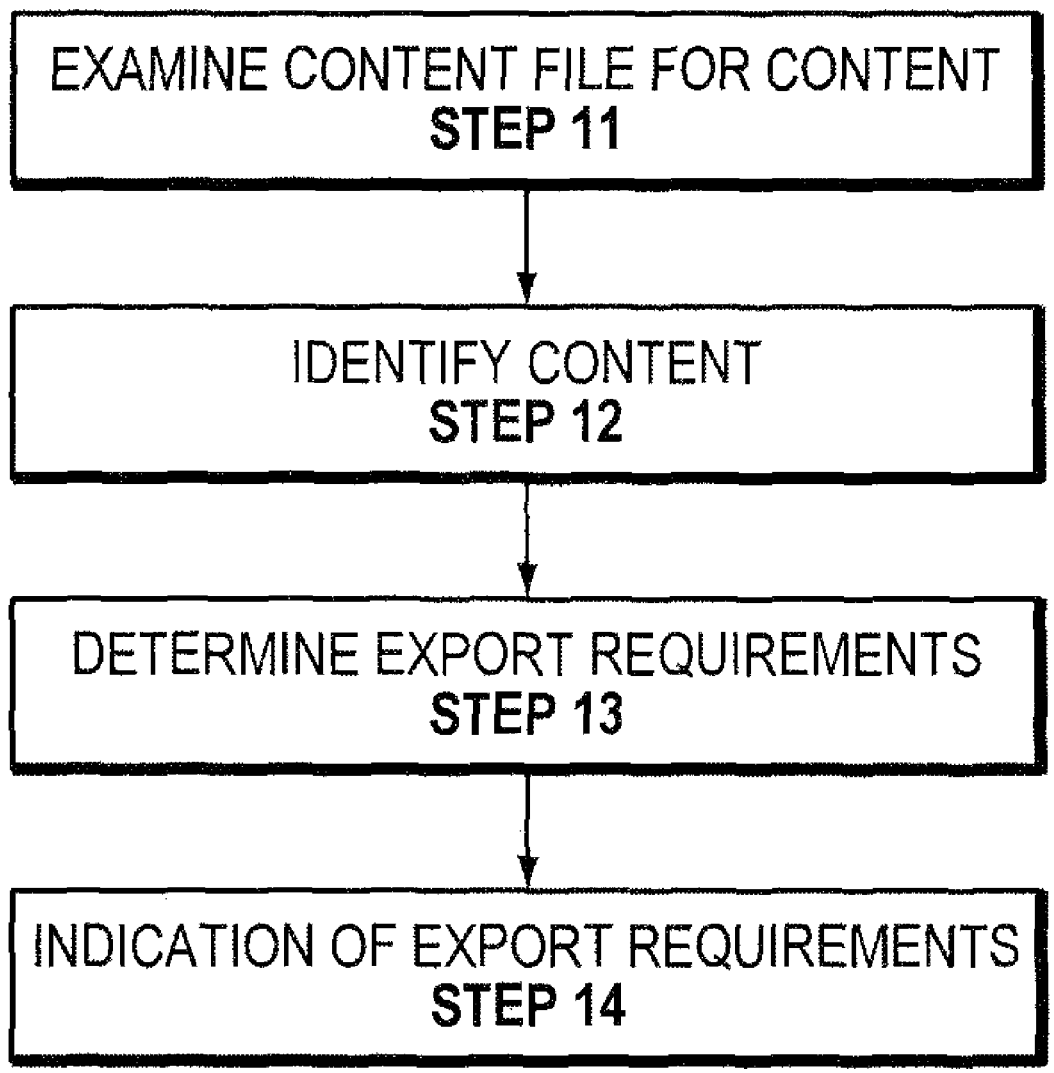
FIG. 1 is a flowchart of an embodiment of a method.

Referring to FIG. 1, a method 10 for providing export requirements includes examining one or more content files for indications that the content files uses or contains content that is subject to export control (STEP 11). A content file may be a traditional element of data storage in a file system, or any other suitable data store or unit of storage, including without limitation one or more files. A content file may be examined in any useful way, using any suitable technique. For example, information in the content file may be examined, or information derived from the content file may be examined. Some techniques for examining a content file are described below, and others may be applied as well. Some techniques involve comparing the file or portions of the file to portions of comparison files that are or may be subjection to export control. Some techniques involve string comparison, data comparison, interface analysis, and so on. Some techniques may require examination of only one content file at a time, and others may involve examination of a number of related files.

A file may be examined for indications of content that is subject to export control. For example, one indication of that content files are subject to export control is if a content file appears to be whole or partial copies of a comparison file that is known to be subject to export control. Another indication that a content file is subject to export control is if the file contains access information or interface information that is associated with a content file that is subject to export control. Another indication that a content file is subject to export control is that it contains text strings associated with content that is subject to export control. Another indication is that the content includes, links to, or otherwise makes use of a content file that is subject to export control.

The user and/or system may identify characteristics of how the content files will be used. As a few non-limiting examples: what encryption mode is used (e.g., how is the algorithm operated, the size of the key space, and so on), whether or not it is used solely for authentication, in what media encrypted data is stored, if any (e.g., in dynamic memory, static memory, hard drive, for transmission over a network), and whether the encryption is used solely for decryption to enable copy protection.

In some embodiments, the examination includes examining for indications of algorithms or interfaces or calls to algorithms of a particular type. For example, the examination may seek to identify indications that cryptographic algorithms are used. A content file may be examined, for example for known interface calls and/or semantics, similarity in computer code or comments, character strings, static data (e.g., constants), subroutines calls, and/or operational steps performed; that are indicative of cryptographic technology.

The content may be identified as content that is or may be subject to export control (STEP 12). This may be accomplished by analysis of the examination results, by further inspection or examination of the content, or by any other suitable technique. This identification may be performed manually by a user, by a user with help from the system, and/or automatically by the system. For example, the system may identify content files that match comparison files, and a user may review the matches to see whether the matches do in fact indicate a match and/or content that is subject to export controls.

Export requirements for the content file may be determined (STEP 13). This may be accomplished through analysis of the identified content. In some embodiments, this may also require additional information about the content, for example how or to whom it may be transferred. Such information may be obtained by default, using information that is already been received from a user, from other information databases, or otherwise. In some cases, additional information about the content may be requested and/or received from a user before, during, or after the steps described here.

Determination logic may be employed using information about the export requirements that are applicable to the jurisdiction in question, and information about the content in question. For example, once a user and/or system has identified that content includes and/or uses certain encryption algorithms, the system may determine the export requirements for that software, based on the identified algorithms and/or other information about the software, such as its intended use, to whom and where it will be distributed, whether it is a mass market product, whether development is or will be outsourced, whether it is an open source project, whether it is a project under test (e.g., a beta test), and so on.

In general, the determination logic will include a representation of the applicable export requirements, so that it is possible through identifying the characteristics of the content files and their use, to determine the applicable requirements. For example, a tree structure may be employed, so that the various possible conditions on the type of algorithms and their intended use will result in the determination of the applicable requirements. As another example, a lookup table may be used to make a determination. In one such embodiment, a lookup table that includes the type of distribution, the product type, the key length of the algorithm, whether it is a mass market product, whether an export classification (e.g., an ECCN) is applicable, and whether it is a restricted item are all inputs into a table that has as its result the applicable export requirements. Other table data may be used in addition or instead in particular implementations.

An indication of the export requirements may be provided (STEP 14). This indication may be a report that indicates the content identified, and the requirements that may be applicable to that content in certain circumstances. This indication may be a report of the particular requirements associated with the content based on the information about the content (e.g., to whom or where it will be distributed or transferred) that has been received.

In some embodiments, the indication may be provided in the form of a completed or partially completed document, such as an export license application, notice, or reporting form. This is intended to facilitate completion and submission of appropriate documentation for export compliance. In one embodiment, the indication may include notice in the form of an electronic mail message to be sent to a government agency for compliance with export requirements. In some embodiments, the indication may be provided to a reporting system, such as provided by a third-party vendor and/or a government. For example, the indication may be provided to the Simplified Network Application Process (SNAP) provided by the U.S. Bureau of Industry and Security (BIS) and/or to their System for Tracking Export License Applications (STELA). The information may be provided as a completed, or partially completed web page form, which may be reviewed and communicated to the relevant government agency.

In various embodiments, aggregated export requirements for multiple files, system components, hardware components, and so on may be identified and tracked. For example, by performing the above steps for each of a number of individual components, export requirements for each of the components may be identified. It would be possible to specify an aggregation of multiple components, and so aggregate the requirements for a computer program or computer system that included all of those components. In another example, if certain software components previously were identified, whether in the export compliance system, a content management system, or otherwise, the information for such files, components, or devices may be combined or aggregated. The information may have been already provided by a user, or may be obtainable by some other means, such as an outside service, web service, or otherwise. For example, if a product to be exported includes a hardware router, and there is publicly available export information associated with that router, the publicly available information may be identified and aggregated with the other information described here.

In one such embodiment, the method includes automatically accessing a publicly available database for export information applicable to a portion of a product. Another portion of the product also include export requirements determined as described here. Export information for the combined product is determined using the information from the publicly available database and the previously determined export requirements. An analogous method uses other previously determined export requirements to provide an indication of export requirements for a combined product.

In some embodiments, the functionality described here may be integrated with a licensing management system or content management system that is already tracking source code components and modules. Export compliance information may be associated with one file, multiple files, a collection of files, components, and so on, and tracked in addition to other information. Information from such a system may be applied to code files or collections of files, libraries, and so on that are identified in such a licensing management or content management system. In some such embodiments, a content management system, such as the PROTEXIP available from Black Duck Software, Inc., of Waltham, Mass., is used to track content management and licensing information as well as export requirements associated with a content file or a collection of content files. Such information may be used in the aggregated determination.

Figure 2:
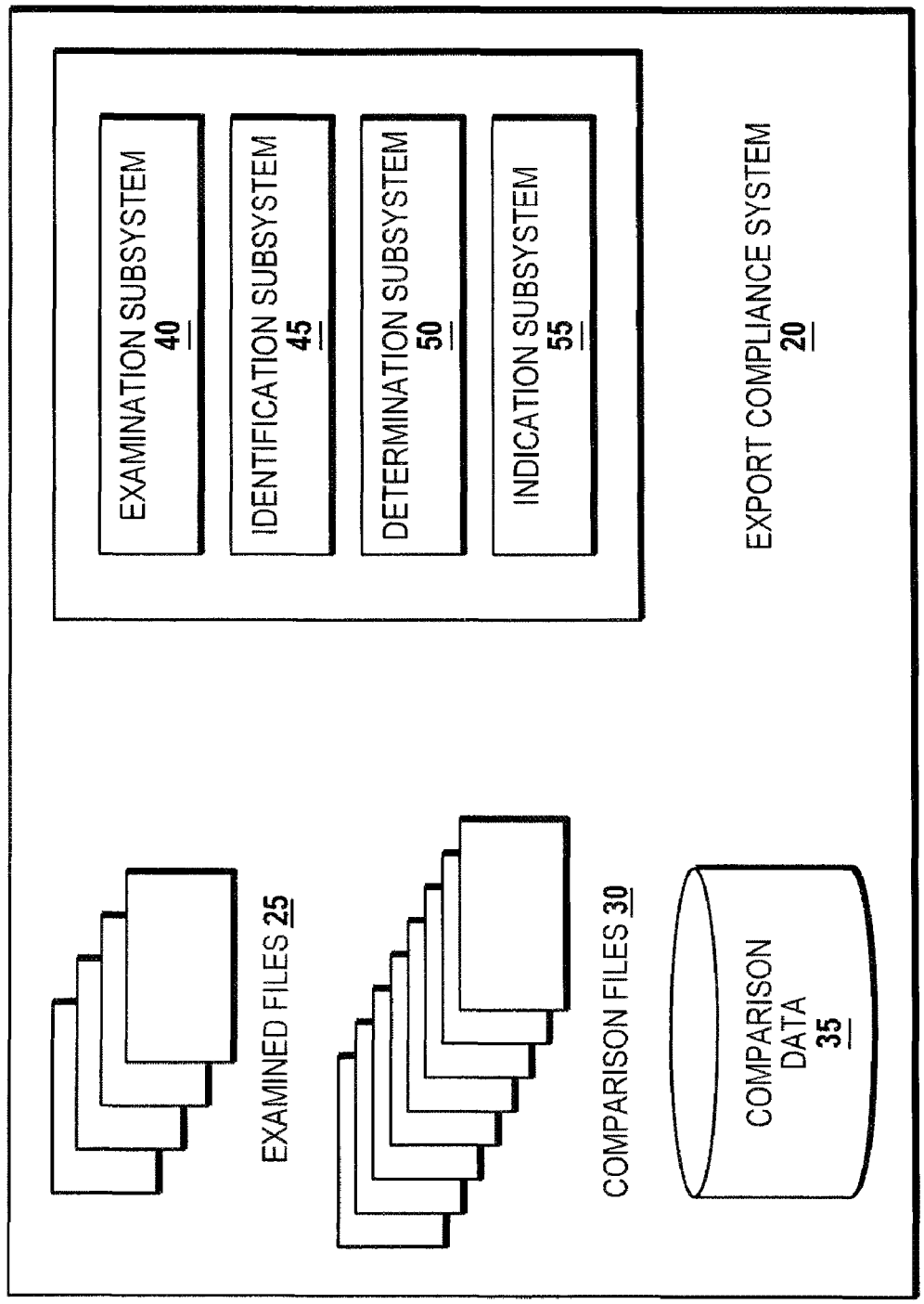
FIG. 2 is a block diagram of an embodiment of an export compliance system.

Referring to FIG. 2, in general, in one embodiment, an export compliance system may include software running on a general-purpose computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH OS X operating system from Apple Computer of Cupertino, Calif., and various varieties of Unix, such as SUN SOLARIS from SUN MICROSYSTEMS, and GNU/Linux from RED HAT, INC. of Durham, N.C. (and others). The system 20 could also be implemented on such hardware as a smart or dumb terminal, network computer, wireless device, wireless telephone, information appliance, workstation, minicomputer, mainframe computer, or other computing device that is operated as a general purpose computer or a special purpose hardware device used solely for serving as a export compliance system 20.

The export compliance system 20 includes or has access to examined content 25, which may be any sort of content. The export compliance system 20 also includes or has access to comparison content 30. The comparison content 30 may be accessed directly, or may be processed in or stored in the form of comparison data 35. Such comparison data 35 may include a database or other collection of information that describes, or is generated from or derived from the content. The comparison data 35 may be used to quickly identify matches. The comparison data 35 also may include one or some combination of comparison words and strings, directory and/or file name, date, and size information, version control and/or content management information, build information, data values, author information, standards information, code structure information, mathematical operations used, license information, and so on.

The export compliance system 20 includes an examination subsystem 40. The examination subsystem examines a content file to identify content subject to export control. The examination subsystem, for example, may calculate data that is derived from the examined content, for comparison with the comparison content 30 and/or the comparison data 35. For example, the examination subsystem may produce data that may be compared with comparison files. The examination subsystem also may search for comparison data 35, e.g., particular strings or data that are not associated with a particular comparison file 30, but which are indicative of export control requirements. The examination system also or instead may identify one, two, or more other types of information, e.g., one or some combination of comparison words and strings, directory and/or file name, date, and size information, version control and/or content management information, build information, data values, author information, standards information, code structure information, mathematical operations used, license information, and so on.

The examination subsystem 40 may also determine whether there is a number of one or more of these that is above a threshold. For example, if the threshold is twenty, the examination subsystem may determine that twenty relevant words and text strings are present. If that is combined with author information, it may be used for identification.

The export compliance system 20 includes an identification subsystem 45 for identifying portions of examined content files 25 that are similar to comparison files 30. The identification subsystem 45 may use data that is generated by the examination subsystem 40 to compare the examined content files with the comparison files. In one embodiment, the identification subsystem 45 uses data calculated using content from the examined content 25 and compares it to comparison data 35, which has been calculated in a similar way, and indexed for fast retrieval. In one such embodiment, after a first identification using calculated comparison data 35, the identification subsystem 45 performs a comparison using the actual content, to identify specifically any overlap.

In one embodiment, the identification subsystem 45 may identify a first portion of an examined content file that is similar to a portion of a first comparison content file and a second portion of the examined content file that is similar to a portion of a second comparison content file. There may be other portions of other files that are also identified. The identification subsystem 45 may facilitate or assist a user in directing the identification. For example, the identification subsystem may allow a user to view examined files, and compare them to matching comparison files. The identification subsystem 45 may facilitate or assist a user in directing the identification of a particular algorithm.

For example, in one embodiment, the examination subsystem may identify a number of content files that match with content files that include or use encryption algorithms. The identification presents this information to a user, and allows the user to compare the files. The identification subsystem enables the user to indicate the algorithms that are in use in or by the examined content files. Upon completion, the system has identified the content that is subject to export control.

In some embodiments, the export compliance system 20 includes a facility for allowing a user to manually identify a component that is included. In this way, even if it is not recognized by the system, the component may be included in the analysis. In some embodiments, the export compliance system includes a facility for importing export requirements from another export system or from publicly available data relevant to all or a portion of a component.

The export compliance system 20 also may include a determination subsystem 50 for determining export requirements that are applicable to the content file. This can be accomplished in any suitable manner. For example, the determination subsystem may apply rules based on the identified content. The determination subsystem may also take into account additional information that may be provided (not shown) about the intended use of the content and/or the intended destination of the content and/or any other relevant information.

The export compliance system 20 also may include an indication subsystem 55 for providing an indication of the determined export requirements. As mentioned, this indication may take the form of a display, report, email and/or other message, warning signal, and so on, and may in some embodiments include documentation or references to documents that describe the application export requirements and/or completed or partially completed documents for submission to a government body or other agency.

Optionally, the export compliance system 20 also may include a receiving subsystem (not shown) for receiving information about the content files. This information may include the intended use for the content files, as well as other relevant information about the content files. The determination subsystem 50 may include information from the receiving subsystem in making a determination about export requirements that are applicable to a content file.

It should be understood that each of these subsystems may be implement by software modules, special-purpose hardware, or any other suitable fashion, and, if software, that they all may be implemented on the same computer, or can be distributed individually or in groups among different computers. There may be multiple instances of some or each of the subsystems, and they may be operated in any suitable manner.

There are many different techniques that can be used to identify similarities between content files. Some of these techniques include comparing the tokens in, the structure of, the flow of execution of, the copyright notices in, the license information in, the license text in, the text strings or larger sections of text in, and/or the symbol tables in the examined file or a sub-portion thereof to those in or of one or more other content files (referred to as comparison files) or sub-portions thereof. Some of these techniques may include comparing interface calls and/or semantics, interfaces implemented, use of particular character strings, static data (e.g., constants), subroutines calls, and/or operational steps. Also or instead other information may be used, such as one or some combination of comparison words and strings, directory and/or file name, date, and size information, version control and/or content management information, build information, data values, author information, standards information, code structure information, mathematical operations used, license information, and so on.

In one embodiment, the export compliance system has a large number of comparison files 30 that are of known origin. Those comparison files can be used for comparison with the examined files 25, to see whether there are any portions of the examined files that are similar to any portions of the comparison files. The comparison files may be, for example, publicly available files, files within a company's own possession, or files provided by a third party for comparison. The comparisons may be accomplished by using the files themselves, or by using data calculated from the files.

Generally, a region of interest in an examined file may be identified by its location and size within the examined file. The region may be determined to match (e.g., within a predetermined threshold of similarity) a comparison file region that also has a location and size. It may be useful, in the context of such a export compliance system, to provide a user of the export compliance system with an indication about which portion of an examined file is similar to a comparison file. Such an indication may include specification of the location and size of the matching portions of the examined and comparison file. Such an indication may include information about the comparison file, such as export restrictions, license information, code structure, mathematical operations used, authorship information, and characteristics of the technology that are relevant to export control. The indication may also include any other useful information about the comparison file. To give some examples: the project of origin, a web site or other contact information for the project authors or owners, support suppliers, royalty or other payments required for use, alternatives to the comparison files that are known to be available, test results, project usefulness ratings, security problems and/or vulnerabilities, later available versions, available modifications, and so on.

It may be possible, however, for a region of interest in an examined content file to be similar to a portion of a first comparison file, and also similar to one or more portions of other comparison files.

In the circumstance that a portion of an examined file is similar to portions of multiple comparison files, it may be helpful to provide the user with an indication of all the portions of all the files that are similar. In some circumstances, however, it is more helpful to identify the best match or matches, rather than all of the files that have similar portions. For example, if the comparison files include multiple versions of the same file, the user may be interested in only the version that is the best match. As another example, if there are multiple copies of the same file, the user may only need to see an indication of one of the copies. Likewise, if there is other information available in addition to the determination of similarity, and that information suggests that one of the comparison files is more likely to be the source of the identified content than the other comparison files, or that it is the best match, then it can be beneficial to provide only an indication of the comparison file that is the best match. This simplifies the communication to the end user, and reduces effort to be undertaken by a person in confirming the match. Techniques for determining the best match may be found in U.S. patent application Ser. No. 11/429,928, entitled "Methods and Systems for Reporting Regions of Interest in Content Files," filed on May 8, 2006, incorporated herein by reference.

A number of techniques are described that will aid a export compliance system in identifying a region of interest in a comparison file that is the best match with a region in an examined file. These techniques may be use separately or in combination, to identify a representative region, file, or collection of files. In general, the techniques are described by way of simplified example, and should be understood to have a wide range of applicability.

In some implementations, an export compliance tool as described here is used in combination with a content management tool such as that as described in the patent application just mentioned, U.S. patent application Ser. No. 11/429,928. The content management tool may be used, for example, to provide license compliance information and the export compliance tool may be used to provide export compliance information. In one embodiment, the examination of files described here takes place as part of an effort that includes both license compliance and export compliance. Information, reports, and documentation are provided that include both license compliance information and export compliance information. It should be understood that there may be efficiency benefits of such a tool, in that the examination of content may only need to be performed once, with results provided that are applicable to both license compliance and export compliance.

FIG. 3-FIG. 15 demonstrate the operation of an embodiment of an export compliance system. It should be understood that this is one exemplary, non-limiting implementation, and that a variety of other implementations are possible.

Figure 3:
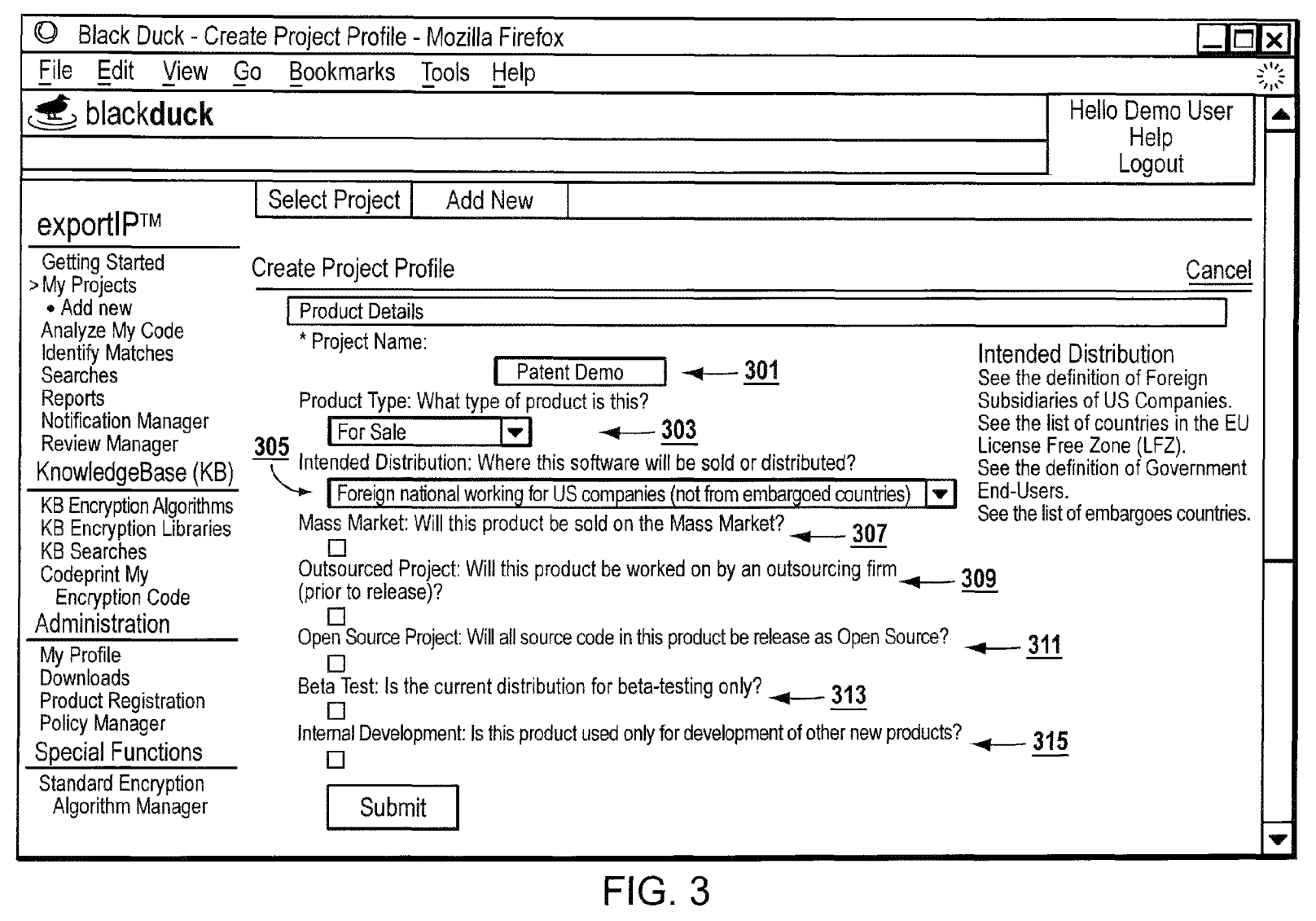

Referring to FIG. 3, in one embodiment, a user of an export compliance tool creates a new project. Details about the project may be provided, such as the project name (called "Patent Demo" in this example) 301. The location of the files for this project, and/or other information about the project, would typically have already be configured. Further details about the project may be provided. In general, information that may be used to categorize the project with respect to the applicable export requirements will be helpful. For example, information requested may include what type of product it is 303 (e.g., for sale, use internally within an enterprise), and the intended distribution 305 (e.g., to whom and/or to where the project will be sold or distributed). Just as some examples, choices of where the product may be distributed include but may not be limited to United States only; Canada; European Union; members of a group of countries referred to as the Supp. 3 License Free Zone (LFZ); foreign subsidiaries of U.S. companies not in embargoed countries; non embargoed foreign national employees of U.S. companies; customers already covered by export licenses; private organizations in the Non License-Free Zone but not embargoed countries; government end-users in non License Free Zone countries but not embargoed countries; and embargoed countries, (e.g., E1 countries). Other information about the project may include whether the product will be sold on the mass market 307, whether the product will be worked on by an outsourcing firm 309, whether the project will be released as open source 311, whether it is a beta test release 313, and whether the product will only be used for development of other new products 315. Other information also may be used instead or in combination with any of the above, as applicable.

In general, this information, along with the specifics of the technology in question may be used to determine export requirements that are applicable to the content file. For example, with respect to encryption technology, the above information along with information about the type of encryption and the key length of the algorithm may be used to determine the applicable export requirements.

Here, the key length is used to mean the range of possible values of an encryption and/or decryption key. The key length is typically measured in bits, such that an algorithm that has a "10 bit" key length has a key that may be selected from $2^{10}$ different values. The key length of a symmetric encryption algorithm may be, for example, less than 56 bits, more than 56 bits but less than 64 bits, or more than 64 bits, with possibly different export requirements for each. Likewise, the key length of an elliptic key algorithm may be less than 112 bits, or more than 112 bits. The key length of an asymmetric key algorithm may be less than 512 bits or more than 512 bits. See, for example, B. Schneier, "Applied Cryptography" $2^{nd}$ ed. (1996), for example at pages 151-168, in which he describes the complexity of a brute force attack based on the key length for different types of algorithms.

Additional information about the encryption algorithm that may be useful may include whether it was modified, adapted or configured for military application, (e.g.: NSA Type 1 Suite A), or the type of cryptographic algorithm (e.g., message authentication code (MAC), cryptographic hash, digital signature, public key encryption, block cipher mode, padding system, and so on).

Figure 4:
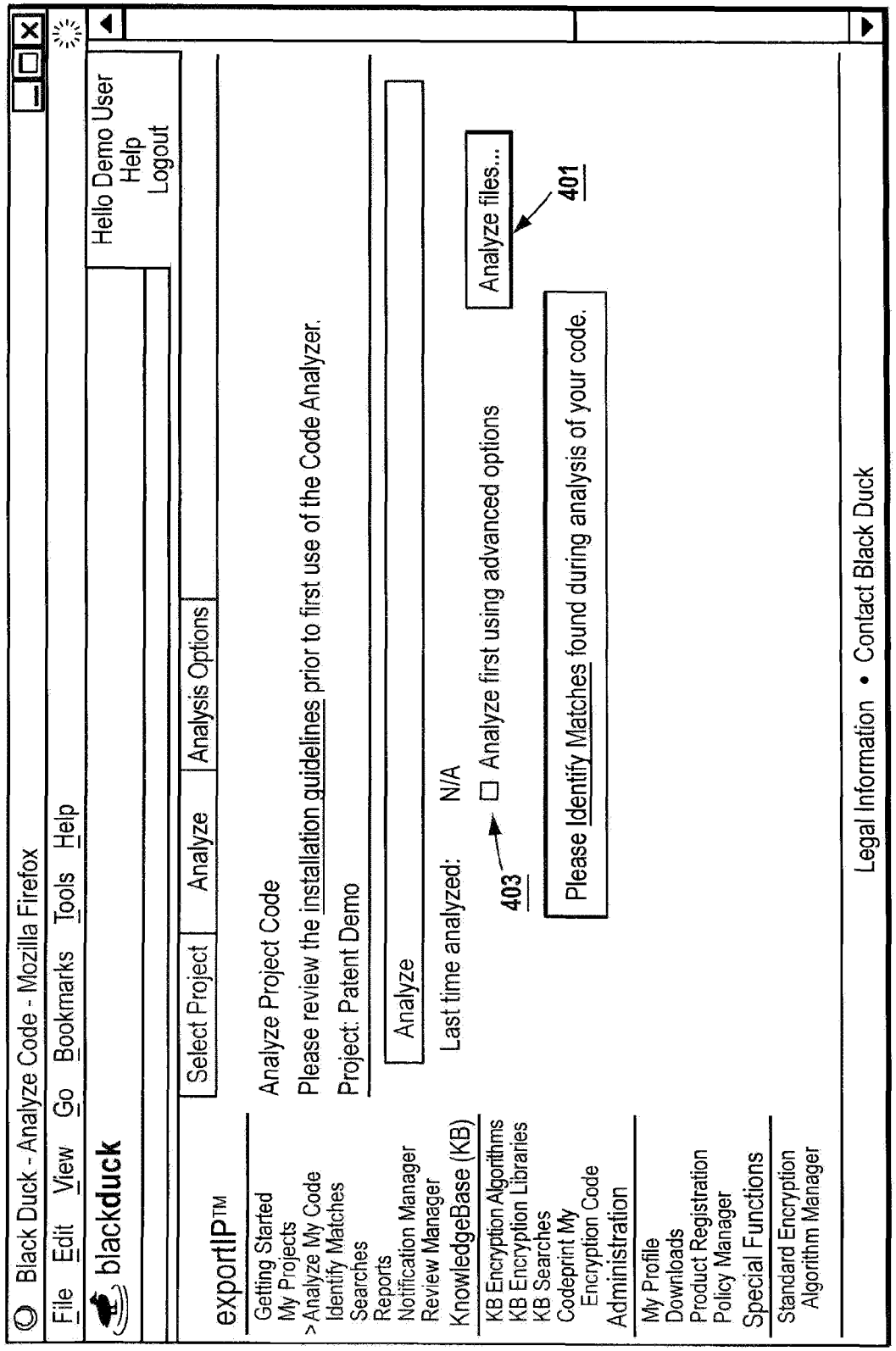

Referring to FIG. 4, an interface is provided to allow a user to begin content examination. A button 401 is provided to start file examination. Optionally, advanced options 403 may be enabled. For example, as an advanced option, it may be possible to configure the system to re-examine files that have not changed, or not to re-examine files that have not changed and that have already been examined. Clicking on the button 401, begins examination of the files.

Referring to FIG. 5, after examination of the files, a list of files 501 is shown. The list includes the file name, and the number of matches. The user can compare the matches to comparison files. The user can identify the algorithm based on the information provided. Thus, in this embodiment, a user is provided with matches to content that is subject to export controls, and the user is able to review the code, and make the determination about whether the content in fact matches the comparison content. In this example, the content with matches includes 4 source code files: "blowfish.c," "sha1.c," "sha256.c," and "tiger.c." Each of these files may be compared to the comparison files, to determine whether the indication of export control is correct.

Referring to FIG. 6, an exemplary file comparison is shown with the examined file 603 and a comparison file 605. The examined file is called blowfish.c in the project "Patent Demo." In this example, the comparison file is called bfpi.h, and is said to come from the cryptlib implementation of the Blowfish encryption algorithm with a user configurable key. The file similarity is shown in the display. In this example, the match that is shown are static data, e.g., constants, that are used by the Blowfish algorithm. Scrolling the scrollbar may reveal other matches between these files. The Blowfish algorithm is subject to export controls in some cases, and so the match from the content files to this comparison file is indicative of export control. As shown in the figure, other tabs indicate other matches with comparison files.

Figure 7:
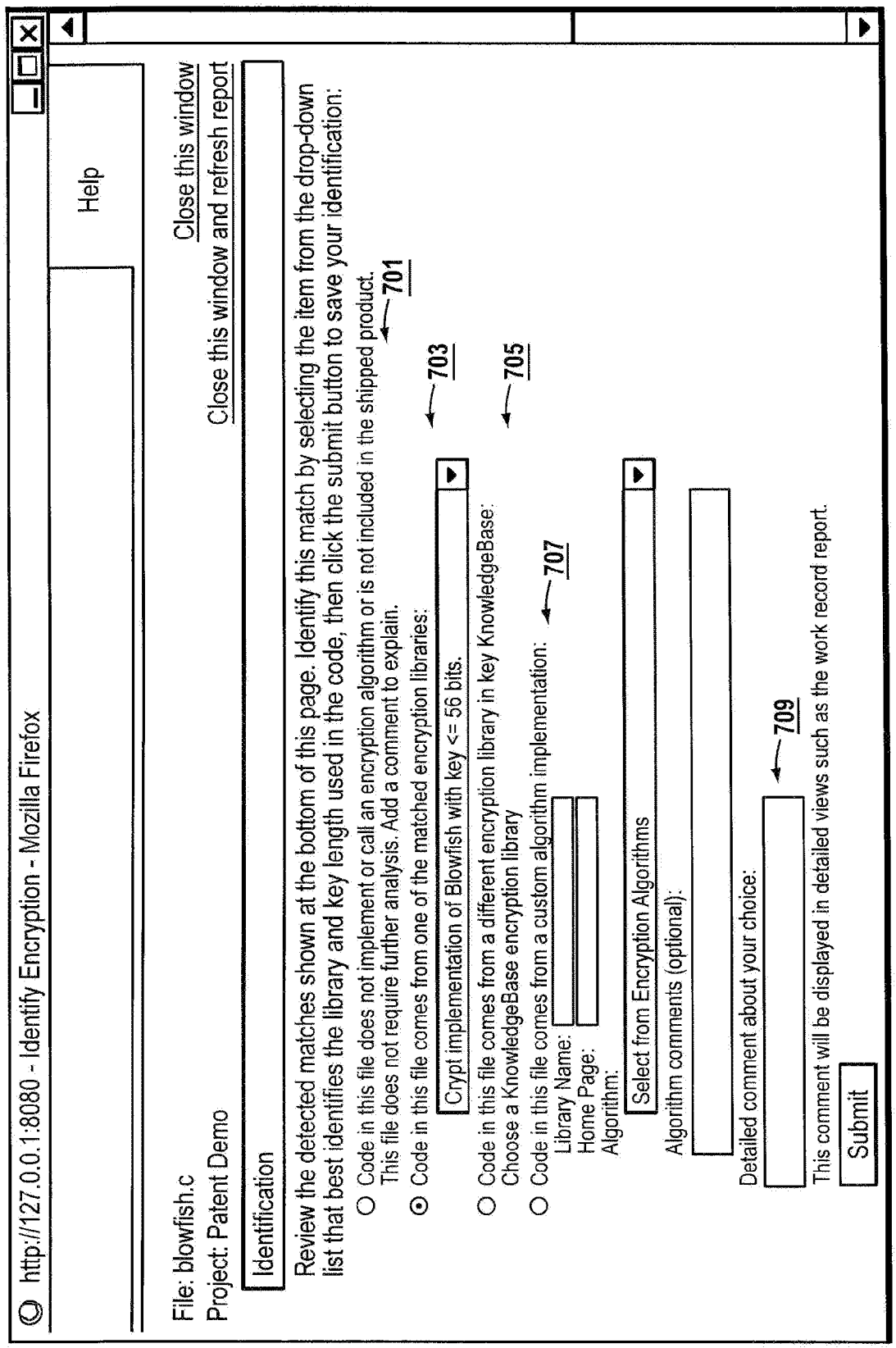

Referring to FIG. 7, having reviewed the comparison between the examined file and the comparison file(s), the user is asked to identify the match. The user may indicate that the file does not implement or call an encryption algorithm 701. In other words, after review, the user may determine that the match was a false hit. The user may identify that the code does match with a comparison file and so the file contains content that may be subject to export control. The user may identify an encryption algorithm that is included or used by the code. As shown, the user has indicated that the examined code is from the Crypt implementation of Blowfish, and the user has determined that the key length is less than 56 bits. As the matching file indicated that the code may implement varying key length, the user may need to make the determination of the key length by examining the code. Other options may include an indication that the code actually matches another encryption algorithm in the library 705 or that the code is from a custom algorithm implementation 707, which may be specified. Additional comments also may be provided 709 to describe the match.

In this embodiment, the system identifies matches to comparison files, and user then reviews the matches and identifies the algorithm that has been found. In practice, it may make sense for an engineer to perform the analysis and identification of encryption technology, under the supervision of a compliance officer and/or attorney.

Figure 8:
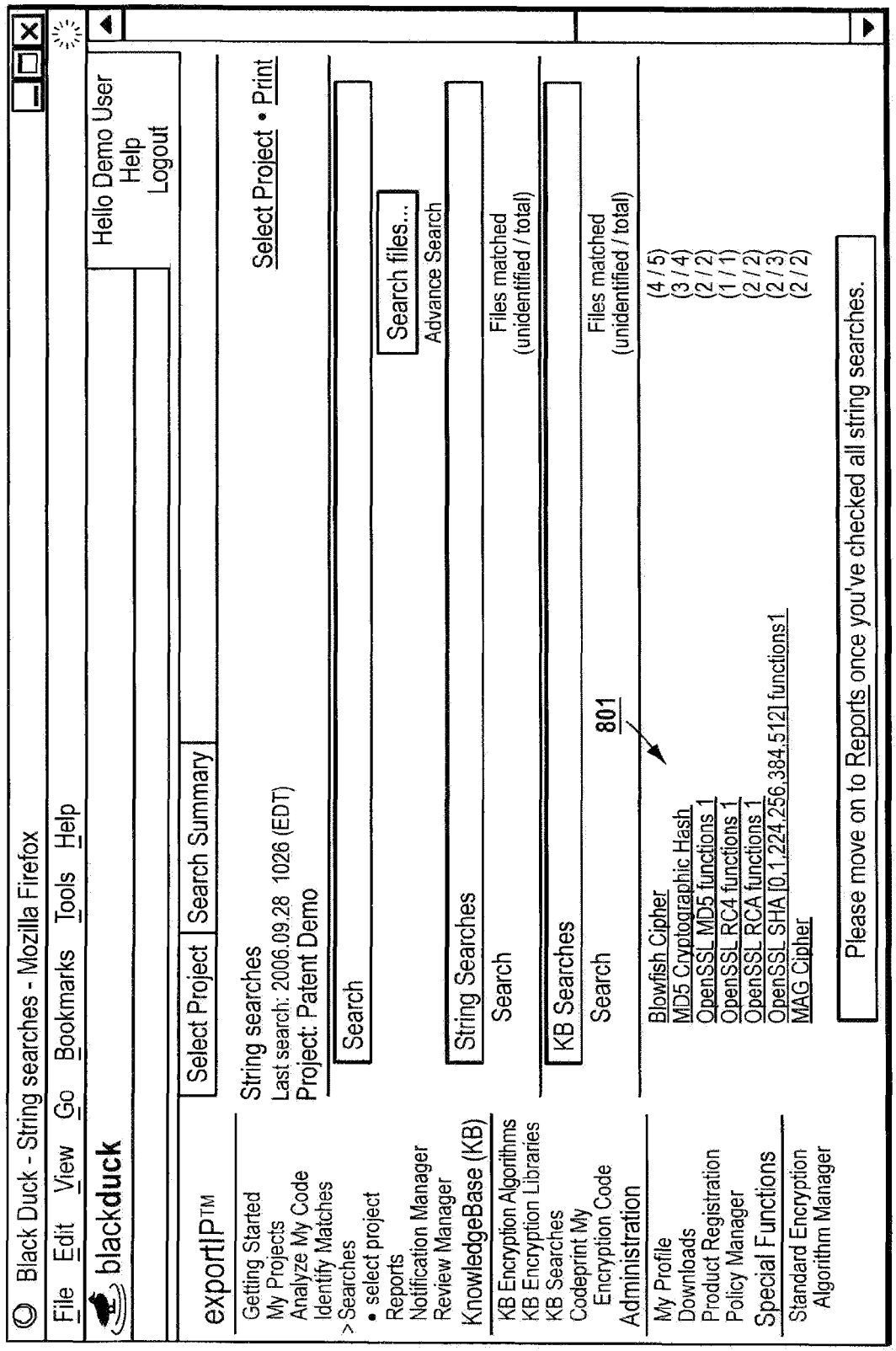

Referring to FIG. 8, in one embodiment, a user is also provided with a list of results 801 of "string searches"—searches for particular text that may be indicative of content subject to encryption control. For example, when searching for encryption technology, the compliance system may look for words like "encrypt" and "encryption" and also for the names of particular algorithms, like "Blowfish" and "MD5." The compliance system may also search for constants that are associated with a particular algorithm. For example, some cryptographic algorithms make use of constants that are used in calculations (e.g., S-boxes). The values associated with these constants will be stored as static data in implementations of those algorithms. As shown, the list is grouped into categories of the types of searches, such as "Cipher-based words" and words associated with the "RSA Algorithm."

Referring to FIG. 9, as an example, the search results for "Open SSL RSA functions 1" are shown. Two files contain words that are associated with this category. A user then has the opportunity to review the string matches within a file (as shown in FIG. 10), and to identify the matches once they have been reviewed.

Figure 10:
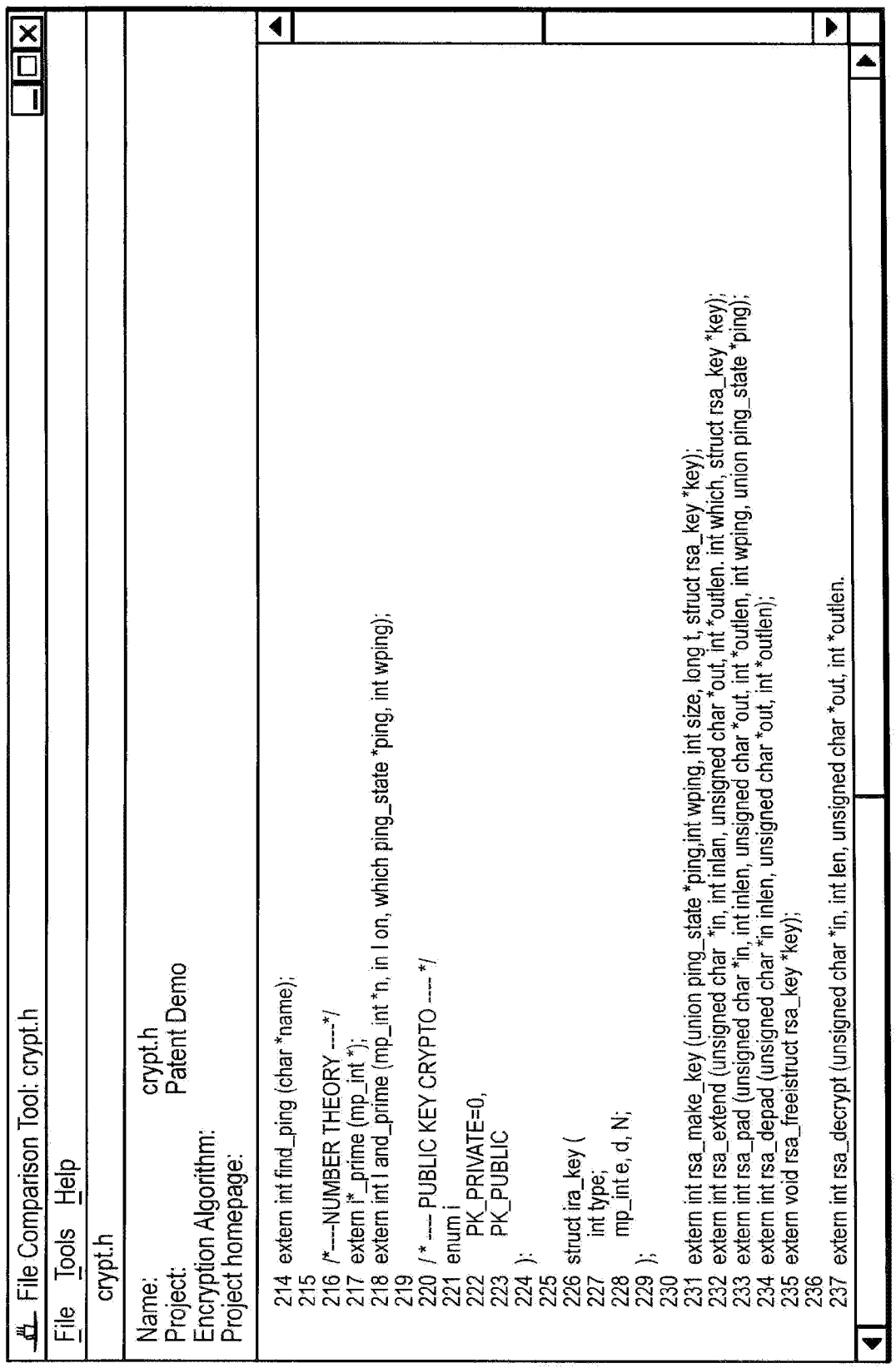

Referring to FIG. 10, the matches for the file crypt.h are shown. Referring to FIG. 11, the user can identify the encryption technology that is associated with the hits.

It should be understood that having both string searches and comparison files may each be useful, and that the result data may be presented in combination, and in other ways. The separate display of results from comparison file searches and string searches is useful, in that it helps the user understand why content files have been selected, but the results may be presented and/or combined in a variety of ways.

Referring to FIG. 12, the user is given an opportunity to provide and/or verify additional information about the project that may determine the export requirements that are applicable. Various export regimes may include exceptions, for example, that may be applicable, such as in the United States, exceptions that apply to smart cards, short range wireless routers, banking and financial systems, open source software, and others. The user here may be asked to specify information that would be indicative of an exemption or otherwise determinative of a requirement. For example, the user may indicate that the product is self-classified according to a particular rule (e.g., in the U.S., exporters may self-classify as 5×992), or as another example, the user may indicate that the project includes an open cryptographic interface 1203. The user also may confirm the information provided in the screen of FIG. 3, such as the type of project 1205, the intended distribution 1207, whether the project is outsourced 1209, whether the project will be released as open source 1211, whether the current distribution is only for beta testing 1213, or whether it is used only for internal development of other new products 1215.

In some embodiments, the information provided is context dependent, such that the information requested is particular to other information that was provided, such as the algorithm identified, the destination specified, and so on. In this way, the system can resolve ambiguity in certain circumstances, but not burden the user with unnecessary questions.

Referring to FIG. 13, the user is presented with an indication of the determined export requirements. For example, export restrictions 1301 are shown, listing export restricted individuals, organizations, and countries. An explanation of why these requirements are applicable is also provided. The list of encryption algorithms identified 1303 that were the basis for the export requirement indication also is provided.

Figure 14:
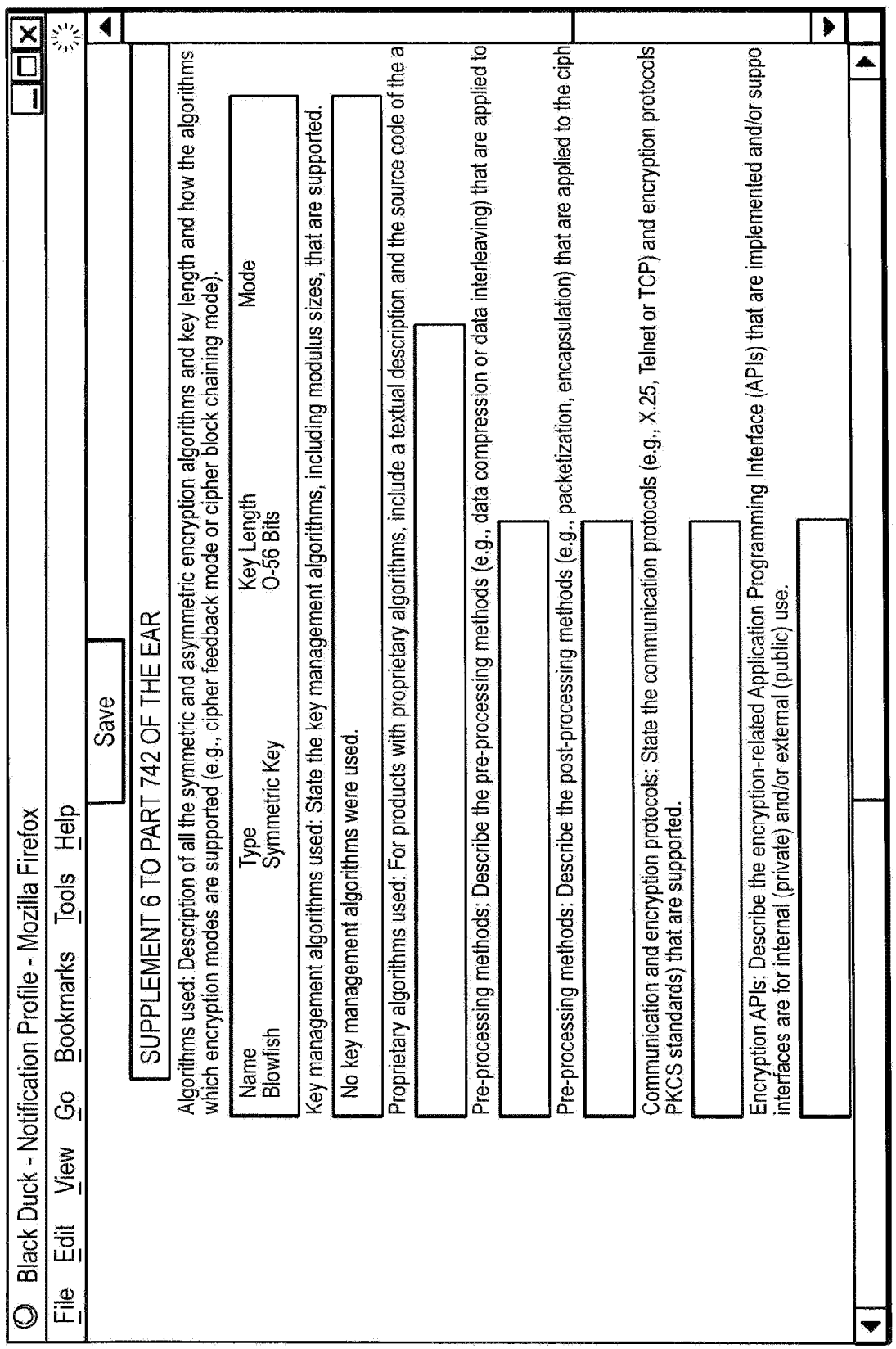

Referring to FIG. 14, if a notification, application, or other document is required, the export compliance system may provide a place for a user to provide information necessary or desirable for completion of the document. As shown, the system has requested that the user complete parts of a BIS notification that have not been automatically generated from the information available to the system. In this example, there is an opportunity for a user to provide description of proprietary algorithms used, pre-processing methods, post-processing methods, other communications and encryption protocols used, and encryption interfaces (e.g., API's). This information may be used to complete a notification.

Referring to FIG. 15, a draft notification is shown. The notification may be a draft paper document that can be printed and sent by mail, electronically (e.g., by electronic mail or web page) or by any other suitable means to an applicable government agency. The notification may be available for viewing and review, and if it is acceptable, the user can direct the system to print or send 1501 the notification. In some embodiments, just the information may be provided, with or without instructions for completing the required information. In some embodiments, a draft word processing document or spreadsheet may be generated. In some embodiments, text to be copied into a word processing document or other form may be provided.

Figure 16:
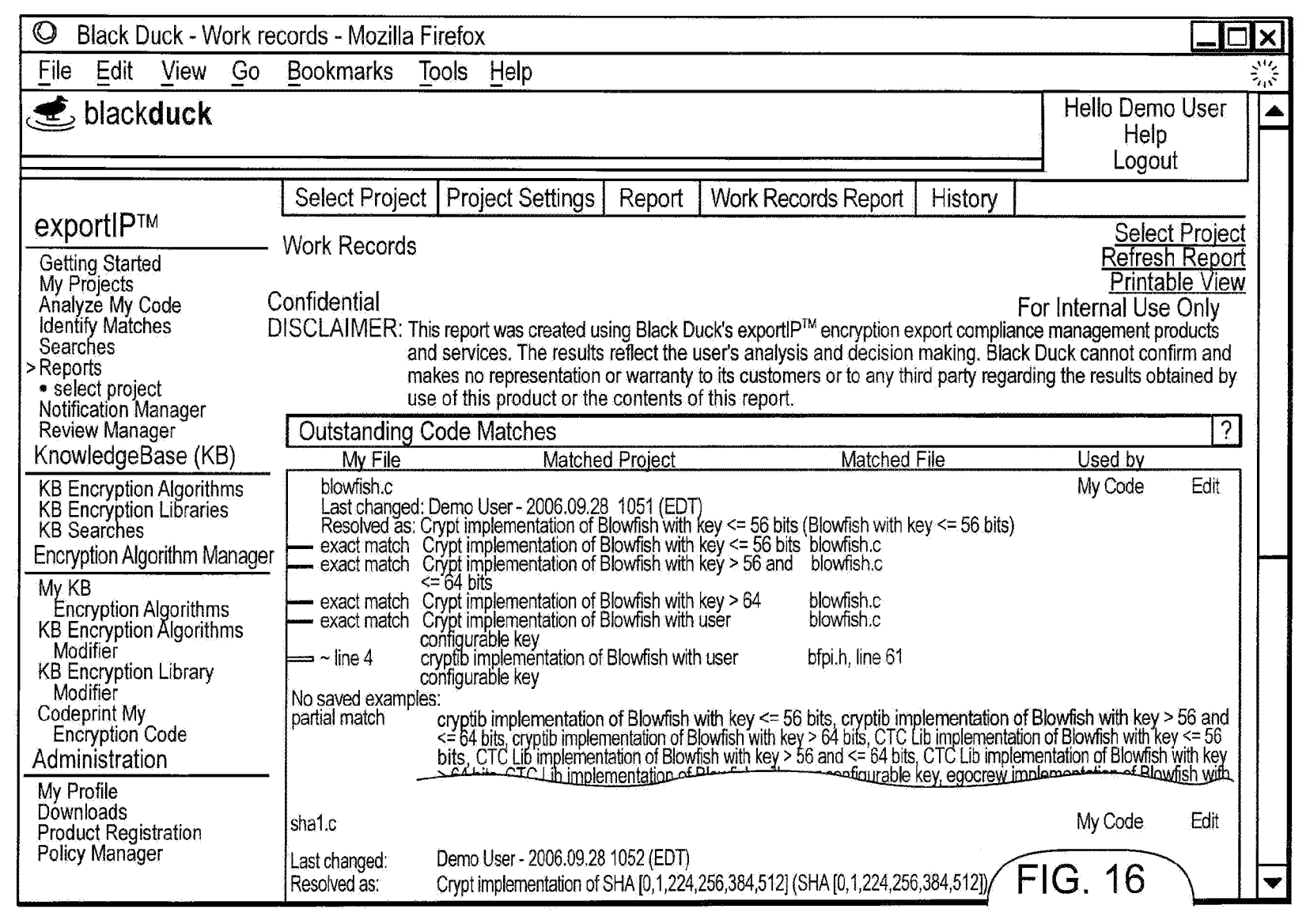

Referring to FIG. 16, in one embodiment, an audit trail of certain user interaction with the system is stored that allows the same or a different user to understand the work that took place with respect to particular content files. For example, the system will allow a user to determine what code matches were identified by the system, what identifications were made by a user (with information about which user, and when the identifications were made), and a summary of the resulting analysis. This allows an administrator or other user, for example, to determine what matches were identified, whether matches were analyzed, and what conclusions were reached. This information may be useful in reconstructing previous work, or in working with an export authority.

Referring to FIG. 17, a summary of the encryption algorithm identified is provided, along with information about the content files that matched. Again, this allows an administrator or other user to review the work done with the system. As shown in the figure, the algorithm that was identified as the Blowfish algorithm matched with a number of implementations of Blowfish in a variety of software components. The identification of Blowfish and the matches would seem to be consistent. By providing this view of the analysis, it becomes easier for someone to review the work done with the system.

Referring to FIG. 18, a history report allows a user to view a work report for a particular date/time. As shown in the figure, the current work report is available, as well as a work report for Sep. 28, 2006 at 10:29 am (2006.09.28 102902). A user may select the desired date/time for report viewing.

Referring to FIG. 19, a historical work report, such as that shown in FIG. 16, is available for the past date/time selected, in this case Sep. 28, 2006 at 10:29 am. In this way, an administrator or user may determine when decisions were made, who made them, and what information they considered (e.g., what matches, etc.)

Techniques for Identifying Similarity Between Content Files

Any suitable technique that is helpful in identifying a region of similarity between an examined file and a comparison file may be used by the export compliance tool. Various embodiments of the techniques are described below. It should be understood, however, that the features of the various techniques described below are not mutually exclusive; they can exist in various combinations and permutations, even if such combinations or permutations are not made express herein, without departing from the spirit and scope of the invention. For example, the export compliance tool may employ one of the techniques described below, or two or more of the techniques described below, for example in combination. It will be understood by one of ordinary skill in the art that some of the techniques described below may be performed by the export compliance tool itself or by the export compliance tool in combination with a database server, even if it is not expressly stated as such. Moreover, it will be understood by one of ordinary skill in the art that the various described manners of inspecting the examined file may similarly be employed to inspect the one or more comparison files prior to comparing the examined file to the comparison file. Alternatively, rather than also inspecting the one or more comparison files in the manner described for the examined file, once the examined file is inspected and the relevant data or information extracted therefrom, the one or more comparison files may be searched for such specific data or information to identify matches between one or more regions within the examined file and one or more regions within one or more of the comparison files.

In one embodiment, the export compliance tool inspects tokens in the examined file. Where the examined file is computer code, the export compliance tool may inspect tokens derived from the source code or from the object code of the computer code. The tokens can take a variety of forms. For example, in one implementation, the export compliance tool breaks the source code or object code down into discrete subsets of code and then, for each discrete subset of code, evaluates a hash function to generate a hash value. Optionally, the generated hash values, or a subset thereof, may then be transmitted to a database server. Either the export compliance tool or the database server, if involved, may then compare the hash values against a collection of known, or recently evaluated, hash values for discrete subsets of code within the comparison files. The comparisons may yield a match between one or more regions within the examined file and one or more regions within one or more of the comparison files.

In another exemplary implementation using tokens, the export compliance tool generates a token for each word, or symbol, in the computer code. Each word or symbol has an assigned token. The code is thus translated to tokens, which tokens are then compared, for example individually, summarily (i.e., some but not all), or in proximate groups, to the comparison files, which may yield a match between one or more regions within the examined file and one or more regions within one or more of the comparison files.

In another exemplary implementation, the export compliance tool generates a token for each item in the code, in a manner similar to tokens generated by a compiler. For example, each token may include a pair of integers, where the first integer is the class of token representing a code element (e.g., START, END, FUNCTION CALL, SYMBOL, CONSTANT, LITERAL, OPERATION, etc.) and the second integer identifies the member of the class (e.g., for class OPERATION, members can include without limitation ADD, SUBTRACT, COMPARE; and for class SYMBOL, the token member might be the string name of the symbol, or an identifier assigned to the string name). The tokens that are generated may then be compared to tokens for the comparison files, for example individually or in adjacent or nearby token groups, which may yield a match between one or more regions within the examined file and one or more regions within one or more of the comparison files. In some embodiments, for some symbol classes, only the token class types are compared. For example, for CONSTANTS and LITERALS, it may be enough to know that a CONSTANT occupied a location between an OPERATION/ADD token and an OPERATION/MULTIPLY token. The combination of some token members, in proximity to some token classes, for example, may be indicative of a match between one or more regions within the examined file and one or more regions within one or more of the comparison files. Use of this technique enables the export compliance tool to identify code that is functionally equivalent, but has been subject to non-functional, textual changes such as a global search and replace of variable names.

As another example, for Java code, the code for each of the examined file and the comparison files may be compiled into bytecode tokens, and the compiled bytecode tokens compared. Although the compiled output may be compiler specific, if the same Java compiler is used to generate the tokens that are used for comparison, any anomalies due to compiler differences can be minimized. As in the example above, if desired, steps can be taken to minimize the impact of any non-functional, textual differences, such that the comparison focuses on functional similarity as represented in a group of adjacent or nearby tokens.

In one embodiment, the export compliance tool inspects the structure of the examined file. For example, where the examined file is a source code file or an object code file, the export compliance tool may inspect the code, or subsets thereof, and generate representations of how the code is structured (e.g., representations of what certain routines, sub-routines, functions, loops, etc. use as parameters, variables, constants, etc.). The generated representations may then be compared against a collection of known, or recently generated, source code or object code structure representations for the comparison files. The comparisons may yield a match between one or more regions within the examined file and one or more regions within one or more of the comparison files.

In one embodiment, the export compliance tool inspects the flow of execution of the examined file. For example, where the examined file is a source code file or an object code file, the export compliance tool may inspect the code, or subsets thereof, and generate representations of the order in which discrete sections of the code (e.g., routines, sub-routines, functions, loops, etc.) are found and/or will be executed. The generated representations may then compared against a collection of known, or recently generated, source code or object code flow of execution representations for the comparison files. The comparisons may yield a match between one or more regions within the examined file and one or more regions within one or more of the comparison files.

In one embodiment, the export compliance tool inspects copyright notices in the examined file. For example, where the examined file is a source code file or an object code file, the export compliance tool may inspect the file and reproduce all copyright notices identified therein. The export compliance tool may identify such copyright notices by, for example, searching the file in a non-case-sensitive manner for the text string "copyright," searching the file in a non-case-sensitive manner for the text string "all rights reserved," searching the file in a non-case-sensitive manner for the text string "(c)," or searching the file for the symbol "©." The reproduced copyright notices may then be compared against a collection of known, or recently generated, copyright notices for the comparison files. The comparisons may yield a match between one or more regions within the examined file and one or more regions within one or more of the comparison files. Also, after having identified the copyright notices within the examined file, the export compliance tool may be configured to search the comparison files for those specifically identified copyright notices. Such a search may also yield a match between one or more regions within the examined file and one or more regions within one or more of the comparison files.

In various embodiments, the export compliance tool identifies zero, one, two, or more of: information about other matches associated with the collection associated with the comparison files, information about directory and/or file names associated with comparison files, information about date information associated with the comparison files, version control and/or content management information, build information (e.g., information based on make files, build scripts, unit tests, and so on), specific words or text strings included in a file, a critical mass of words or text strings included in a file, data values included as data, author information, information on standards implemented, code structure information, mathematical operations used, license information associated with the comparison files, an indicator that a comparison is believed to be an original, and an indicator that a comparison is not an original. Each type of information may be used separately and/or in combination with other information.

In one embodiment, the export compliance tool inspects license information, which may be incomplete, in the examined file. For example, where the examined file is a source code file or an object code file, the export compliance tool may inspect the file to identify all instances where license information appears. The export compliance tool may then reproduce certain license information from the identified instances, such as, for example, identifications of the licenses themselves and/or the types of the licenses, the scopes of the licenses, the durations of the licenses, the payments to be made under the licenses, or combinations thereof. The reproduced license information may then be compared against a collection of known, or recently reproduced, license information from the comparison files. The comparisons may yield a match between one or more regions within the examined file and one or more regions within one or more of the comparison files.

In one embodiment, the export compliance tool inspects license text, which may be incomplete, in the examined file. For example, where the examined file is a source code file or an object code file, the export compliance tool may inspect the file to identify all instances where license text appears. The export compliance tool may then reproduce all or certain portions of the license text from the identified instances. The reproduced license text may then be compared against a collection of known, or recently reproduced, license text from the comparison files. The comparisons may yield a match between one or more regions within the examined file and one or more regions within one or more of the comparison files.

In one embodiment, the export compliance tool inspects the examined file for specific text strings. For example, where the examined file is a source code file, the export compliance tool may inspect the file to identify the presence or absence of certain text strings, such as, for example, "blowfish," "public key," and "encryption." Where the examined file is an object code file, the export compliance tool may employ a hexadecimal translator to inspect the file and identify the presence or absence of certain text strings in constants. Having identified certain specific text strings, the export compliance tool may then reproduce the text strings and compare them against a collection of known, or recently reproduced, text strings for the comparison files. The comparisons may yield a match between one or more regions within the examined file and one or more regions within one or more of the comparison files.

In one embodiment, the export compliance tool filters its identification of specific text strings in the examined file and may also filter its comparison of the identified text strings against the comparison files. For example, where the examined file is a source code file, the export compliance tool may filter or restrict its identification of specific text strings to those which occur only in the comments or, alternatively, to those which occur only in the code. Moreover, the export compliance tool may filter or restrict its identification of specific text strings to those text strings that occur only in string constants or to those that occur only in the lowercase, and may treat all white-spaces, no matter how long, as equal. The query against the collection of known, or recently reproduced, text strings for the comparison files may also be filtered as such.

In one embodiment, rather than inspecting the examined file for specific text strings, the export compliance tool reproduces larger sections of text from the examined file, for example from the source code of the examined file, and compares those text sections against a collection of known, or recently reproduced, text sections from the comparison files. The comparisons may yield a match between one or more regions within the examined file and one or more regions within one or more of the comparison files.

In one embodiment, where the examined file is an object code file, the export compliance tool inspects the object code file to identify its symbol tables. Having identified the object code file's symbol tables, the export compliance tool may then reproduce the symbol tables themselves, or, alternatively, only its symbols, and compare them against a collection of known, or recently reproduced, symbol tables or symbols of the comparison files. The comparisons may yield a match between one or more regions within the examined file and one or more regions within one or more of the comparison files.

Data Matching

In one embodiment, the export compliance tool searches for particular data values that may be specific to an algorithm. To match data values in source code, for example, using a single canonical representation of the data value, the system may consider the different ways a programmer might write those values. Those ways may include different formats (e.g., decimal, hexidecimal, octal or other formats); different array types (e.g., arrays of bytes (8 bits), shorts (16 bits), words (32 bits), double words (64 bits)); different number of items per line (e.g., 1-32, depending upon what array type is used); different machine-dependent value ordering (e.g., big-endian or little-endian); different programming language array syntax (e.g., separate values by comma (as in Java, C, perl), whitespace (as in lisp, scheme)); different programming languages format specifiers (e.g., 0x (hexadecimal in Java, Perl, C), 0 prefix (octal in java, Perl, C), Z' . . . ', Z . . . , Z" . . . " (hexadecimal in Fortran), 0' . . . ', O . . . , O" . . . " (Octal in Fortran), B' . . . ', B . . . , B" . . . " (binary in Fortran), $ (hexadecimal in Pascal), 2# . . . , 8# . . . , 16# . . . (binary, octal, and hexidecimal in Pascal), 16# . . . # (hexadecimal in Ada and VHDL) and so on); different programming languages type specifiers (e.g., ul, ull appended in C); abbreviated and extended forms (e.g., leading zeros (e.g., 0x000A or 0xA)); and variations and combinations of the above. In some embodiments, comparison files are generated that have the variations of the desired values, which are then used for comparison. In other embodiments, a separate search and/or examination is made for the particular values, as part of a text string search or otherwise.

To match data in object files, the system may need to consider some of the above, such as value-ordering (e.g., big-endian or little-endian) and array types, as well as different binary formats (e.g., JAVA bytecode, a.out, ELF, PE, COFF, EXE, COM, XCOFF, and PEF binary formats, .NET "Managed Code", and potentially many other bytecode formats including those for CLISP, Smalltalk, and Parrot). Again, comparison files may be generated based on the data, or other examination techniques may be used.

These techniques may be particularly applicable to identifying encryption algorithms that have been designed with specific data constants.

Collection Information

In one embodiment, files are associated with collections. These collections may be files associated with a particular project, program, subsystem, book, or other group. The association of files with projects may be used to determine which of a number of matching files is the best match.

For example, if a portion of a first file matches similar-sized portions of multiple files within a collection (e.g. within the same project), the indication of similarity may initially only specify one of the files. This simplifies reporting for the user, but without much additional risk from being underinclusive because the details about the collection (e.g., license, vendor, etc.) are likely to be the same for the content files in the collection. For example, collections may be organized in the comparison file library so that this is the case.

(It should be understood that if any of the matches were a superset of the others, that one would be the best match.)

In another example, if a region in a comparison file matches regions in several different examined files, and the similar regions are all (approximately or exactly) the same size, one of the regions may be selected, for example using the techniques described here (e.g., based on other matches to other regions and so on), and the other similar regions not initially indicated. For example, if there is a different region in the same comparison file that is a superset of other matches, it may be that other portions in the same file are the best match, too, and may be indicated to the user as such. This should serve to identify the match that is the most representative within a collection.

As another example, if one file has multiple regions that match with multiple regions from the same collection (as well as individual regions in files from other collections), it may be that the similar regions in the examined file are more likely to be from the collection in which there are multiple region matches, and so the files from the same collection are the best match.

In another embodiment, in which files are associated with collections, a match in a file is considered to be the best match if there are other portions in the same or related examined files that match with file(s) from the same collection. In this way, the similarity of portions of examined files to a collection of files is considered. This would be a useful case if multiple portions of content files were copied from the same source.

Directory Matching

In another embodiment in which files are associated with collections, directory components may be compared to determine whether there are similarities. For example, if there are a number of files that have file and directory names that match with a particular collection, it may be determined that the files match with that collection.

Time Information

In one embodiment, when a portion of an examined file matches with similar-sized portions of multiple examined files, and the techniques above do not result in a selection of the best match, other information associated with the matched comparison files may be used. For example, in one embodiment, the date/time applicable to the comparison files (or the portions of the comparison files) are considered. An assumption may be made that the comparison file(s) with the earliest date/time are the original source of the content. For example, if one comparison file has an associated date of Jan. 10, 2005, and a second comparison file has an associated date of Jan. 20, 2000, the best match is the second comparison file, because it is more likely to be the original. This technique may be particularly relevant when the matching portions are entire files. In such case, the earlier file is most likely to be the original source, and as such, the best match.

Author Information

In one embodiment, information regarding an author may be used. For example, an author may have a particular cryptographic expertise. The inclusion of a particular author's name may be indicative of a particular code match and/or a particular type of encryption. The indication of the author may be determined in code comments at the top or in the code, or in metadata describing the code, such as information from a build tool, source control/content management information, and so on.

Version Control Information

In some embodiments, information from source code control/version management/content management information may be used. For example, metadata in such a management system may indicate what algorithms are included in a content file. The information in the content management system may indicate who added the file, or contents to the file, and what the purpose of adding the content. Other information in the content management system also may be useful.

Standards Information

In some embodiments, reference to a particular standard may be indicative of a particular type of encryption. For example, Internet Engineering Task Force RFC 1321 is entitled "The MD5 Message-Digest Algorithm" by R. Rivest, April 1992. Reference to RFC 1321 may be indicative of the MD5 message digest algorithm. Likewise, reference to particular IEEE standards, ISO standards, or other standards may be useful in identifying an algorithm.

Build File/Compiler Information

In some embodiments, build file information and/or compiler information will indicate files that are included or linked. This information may be used to identify particular libraries. For example, symbols and/or symbol tables may provide information about code that will be used by a particular code file. Likewise, indications about files that need to be built if other files are changed are indicative of dependencies.

Information Aggregation

In some embodiments, an aggregation of certain words or text strings, or other information as described here, may be indicating of a particular algorithm. For example, while one or two words may not themselves be indicative, a collection of words may be indicative of a particular algorithm. Likewise, certain compiler information in combination with certain text may be indicative of an algorithm.

Mathematical Operations Used

Use of certain mathematical operations may be indicative of an encryption algorithm. For example, certain algorithms make use of XOR operations, and large integer math libraries. Although there are many other types of algorithms that use such operations, the use of such operations may be indicative of a match, particularly in combination with other types of matches.

Code Structure

Certain types of programming patterns may be indicative of an encryption algorithm. For example, such algorithms tend to include repetitive computational loops. Although there are many other types of algorithms that have such structure, the presence of such structure may be indicative of a match, particularly in combination with other types of matches.

License Information

In some embodiments, other information associated with the matched files may be used to identify the best match. For example, the licensing information applicable to the comparison files may be considered.

Figure 20:
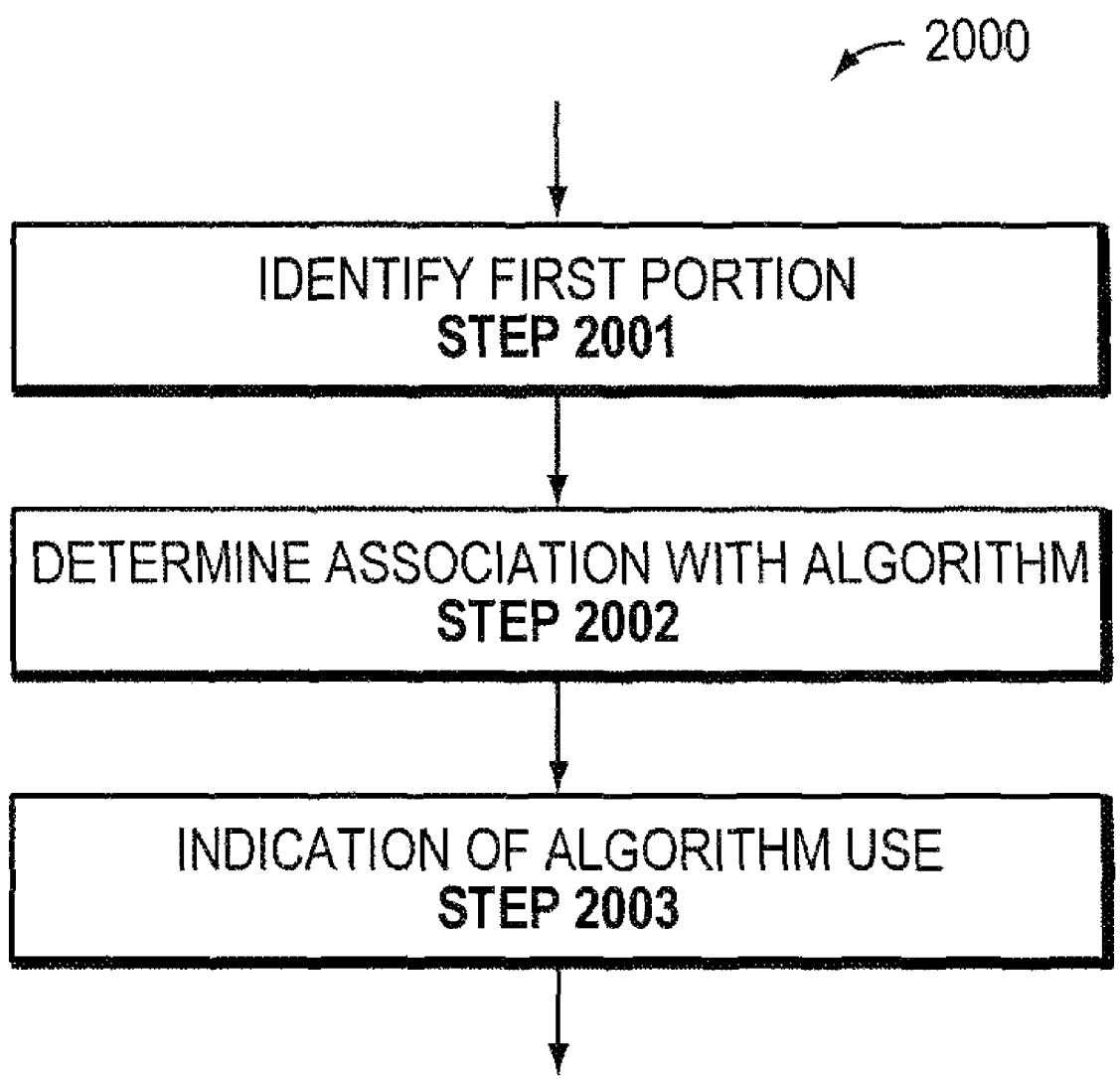
FIG. 20 is a flowchart of an embodiment of a method.

Referring now to FIG. 20, in one embodiment, a method 2000 for examining a software program to identify an algorithm is used. This method may be part, for example, of the method of FIG. 1, and may be used as part of the identifying step (STEP 12). Likewise, the method may be implemented in the identification subsystem of FIG. 2, so as to automatically identify algorithms without user intervention. This method may also be used in other contexts when it is useful to identify a particular algorithm.

The method includes identifying a first portion of the software program that is similar to a portion of a comparison program 2001. The first portion may be any portion of a software program, and may include similarity of computer code, interfaces, character strings, static data, and/or a subroutine call. Zero, one or more of these may be used in combination to identify an algorithm used by a program.

The method also includes determining that the first portion is associated with an algorithm 2002. For example, if the algorithm is known to be implemented in a particular comparison content file, a match between the computer code of the content file and a comparison content file as described above may be indicative of the algorithm being used. If the interface to a known algorithm is used in a content file, this may be indicative of the algorithm being used. Likewise, if constants associated with the algorithm, and computer code associated with the algorithm are both identified, this may be indicative that the first portion is associated with the algorithm.

In some embodiments, two, three, or more portions may be used, and the method may include matching different portions of the comparison program, and making a determination based on whether the different portions indicate the same algorithm.

The method also includes providing an indication that the software program uses the identified algorithm 2003. This may be a notification, screen display warning signal, message (e.g., instant message, electronic mail message, text message). In some embodiments, the indication may include export information and/or documentation as described above. The indication also may include a message or communication to a determination subsystem, as shown in FIG. 2.

In various embodiments, the algorithm may be an encryption algorithm, and the method may include identifying implementation characteristics of the algorithm, such as key length, encryption mode, media on which encrypted data would be stored/communicated, the extent to which the algorithm is accessible to an end user, and so on.

In various embodiments, there may already be export-related information that is available for certain software and hardware components of a system. The system may automatically (e.g., through an outside service, web access, or otherwise) identify the available export information that is available for those components, and include such information in an analysis.

It should be understood generally that the systems and methods described here are exemplary, and that other variations within the spirit and scope of the invention are included.

What is claimed is:

1. A computer having a computer readable memory storing computer readable instructions therein to perform a method for export compliance, the computer readable memory comprising:
   instructions to perform a computer-assisted examination of one or more computer software files;
   instructions to identify, in response to the examination results, computer software used by or included in the one or more computer software files that is indicative of an encryption algorithm;
   instructions to determine, in response to the identified computer software, export requirements applicable to the one or more computer software files; and
   instructions to provide an indication of the determined export requirements.

2. The computer of claim 1, further comprising:
   instructions to receive information regarding the expected use of the computer software files;
   and wherein the instructions to determine further comprise instructions to determine in response to the identified computer software and the received information regarding the expected use.

3. The computer of claim 1, further comprising instructions to identify computer software subject to export control by presenting examination results to a user.

4. The computer of claim 1 further comprising instructions to aggregate the determined export requirements with export requirements applicable to other computer software files.

5. The computer of claim 1 further comprising instructions to aggregate the determined export requirements with export requirements obtained from a publicly available database of export information.

6. A system for export compliance, comprising:
   a processor operatively coupled to a data store having one or more computer software files;
   a user interface, including display and user input devices; and
   the processor configured to provide:
      an examination subsystem for performing a computer-assisted examination of the one or more content software files;
      an identification subsystem for identifying, in response to the examination results, computer software used by or included in the one or more computer software files that is indicative of an encryption algorithm;
      a determination subsystem for determining in response to the identified computer software, export requirements applicable to the one or more computer software files; and
      an indication subsystem, for providing an indication of the determined export requirements utilizing the user interface.

7. The system of claim 6 wherein the processor is further configured to provide a receiving subsystem for receiving information regarding the expected use of the computer software files; and wherein the determining subsystem determines export requirements in response to the identified computer software and received information regarding the expected use.

8. The system of claim 7, wherein the identification subsystem identifies computer software subject to export control by presenting examination results to a user utilizing the user interface, and receiving user input regarding the computer software utilizing the user interface.

9. A computer having a computer readable memory storing computer readable instructions therein to perform a method for export compliance, the computer readable memory comprising:
   instructions to perform a computer-assisted examination of a software program;
   instructions to identify, in response to the examination results, a portion of the software program indicative of encryption technology included in or used by the software program;
   instructions to determine export requirements associated with the encryption technology indicated by the identified portion of the software program; and
   instructions to provide an indication of the determined export requirements for the software program.

10. The computer of claim 9, further comprising:
    instructions to receive information regarding the expected use of the software program;
    and wherein the instructions to determine further comprise instructions to determine export requirements in response to the identified portion of the software program and the received information regarding the expected use.

11. The computer of claim 9 wherein the identified portion is an encryption algorithm.

12. The computer of claim 9 further comprising instructions to identify a portion of the software program without user intervention.

13. A system for export compliance, comprising:
    a processor operatively coupled to a data store having a software program;
    a user interface, including display and user input devices; and
    the processor configured to provide:
       an examination subsystem for performing a computer-assisted examination of the software program;
       an identification subsystem for identifying, in response to the examination results, a portion of the software program indicative of encryption technology included in or used by the software program;
       a determination subsystem for determining export requirements associated with the encryption technology indicated by the identified portion of the software program; and
       an indication subsystem for providing an indication of the determined export requirements for the software program utilizing the user interface.

14. The system of claim 13 wherein the processor is further configured to provide a receiving subsystem for receiving information regarding the expected use of the software program; and wherein the determination subsystem determines export requirements in response to the identified portion of the software program and the received information regarding the expected use.

15. The system of claim 13 wherein the identified portion is an encryption algorithm.

16. The system of claim 13 wherein the identified portion interfaces with an encryption algorithm.

17. The system of claim 13 wherein the identification subsystem identifies a portion of the software program by presenting examination results to a user utilizing the user interface.

18. The system of claim 13, wherein the identification subsystem identifies a portion of the software program without user intervention.

* * * * *